(12) United States Patent
Fernandez

(10) Patent No.: US 8,918,423 B1
(45) Date of Patent: Dec. 23, 2014

(54) ENTERPRISE DYNAMIC ACCESS CONTROL SYSTEM AND METHOD USING AN OBJECT SELECTION PROFILE

(71) Applicant: The United States of America as represented by the Secretary of the Navy, Washington, DC (US)

(72) Inventor: Richard Fernandez, Kailua, HI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 281 days.

(21) Appl. No.: 13/633,994

(22) Filed: Oct. 3, 2012

Related U.S. Application Data

(63) Continuation-in-part of application No. 11/167,404, filed on Jun. 27, 2005, now Pat. No. 8,290,979, and a continuation-in-part of application No. 11/081,896, filed on Mar. 10, 2005, now abandoned, and a continuation-in-part of application No. 11/081,897, filed on Mar. 10, 2005, now abandoned.

(51) Int. Cl.
*G06F 17/30* (2006.01)
(52) U.S. Cl.
USPC .......................................... 707/782; 707/783
(58) Field of Classification Search
USPC .................................. 707/782, 783
See application file for complete search history.

(56) References Cited

U.S. PATENT DOCUMENTS 5,263,157 A * 11/1993 Janis ....................................... 1/1
5,761,429 A * 6/1998 Thompson ..................... 709/224

OTHER PUBLICATIONS

Fernandez, Richard, "Enterprise Dynamic Access Control Version 2 Overview", Jan. 1, 2006, http://csrc.nist.gov/rbac/EDACv2overview.pdf.

* cited by examiner

*Primary Examiner* — Apu Mofiz
*Assistant Examiner* — Fariborz Khoshnoodi
(74) *Attorney, Agent, or Firm* — SPAWAR Systems Center Pacific; Kyle Eppele; Ryan J. Friedl

(57) ABSTRACT

A system and method are provided for determining object access to a resource by comparing reference inputs from an object profile, an object selection profile, an environmental status, and/or a complex outcome to one or more resource profile reference conditions contained in one or more resource profiles. The object profile reference input comparison to the resource profile reference conditions is based on a plurality of object profile categories each including a plurality of hierarchically linked object profile values. The object profile represents no more than one object profile value for each object profile category. The object selection profile reference input comparison to the resource profile reference conditions is based on a plurality of object selection profile categories each including a plurality of hierarchically linked object selection profile values. The object selection profile includes one or more object selection profile values for a particular object selection profile category.

20 Claims, 22 Drawing Sheets

ENTERPRISE DYNAMIC ACCESS CONTROL SYSTEM AND METHOD USING AN OBJECT SELECTION PROFILE

CROSS-REFERENCES TO RELATED APPLICATIONS

This application is a continuation-in-part of commonly-assigned U.S. patent application Ser. No. 11/167,404 filed Jun. 27, 2005, entitled "Software Architecture for Access Control Based on Hierarchical Characteristics", which is a continuation-in-part of both commonly-assigned U.S. application Ser. No. 11/081,896, filed Mar. 10, 2005, entitled "Method of Access Control Based on Hierarchical Characteristics", now abandoned, and commonly assigned U.S. application Ser. No. 11/081,897, filed Mar. 10, 2005, entitled "System of Access Control Based on Hierarchical Characteristics", the content of all of the above-referenced applications are fully incorporated by reference herein.

FEDERALLY SPONSORED RESEARCH AND DEVELOPMENT

The Enterprise Dynamic Access Control System and Method Using an Object Selection Profile is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil. Reference Navy Case No. 101917.

BACKGROUND

Access of objects to resources such as, software applications, web services, physical containers or even facilities, are becoming increasingly difficult to manage via access control lists (ACLs) or group policies. An "object" typically represents a person or thing seeking resource access. ACLs usually grant resource access by evaluating an object's name or unique identifier and comparing it to a pre-approved list. If an object, such as a user, is re-assigned, changes clearance, or is promoted, access to resources should also change. Currently, ACL resource managers (RMs) must evaluate personnel records to determine resource access. Such a task can become time-consuming and inefficient as the number of personnel and resources within an organization grow. Limited access to personnel records by RMs could compound the problem.

Another limitation with ACLs and group policies is their inability to accurately and quickly respond to the existence of constantly changing environmental statuses. Homeland Security and regional Information Assurance (IA) agencies are authorized to impose security levels (environmental condition) within their jurisdiction. Access to a wide range of resources by many objects should be affected at the precise time a security level (environmental status) changes. Sudden changes in security conditions may not allow sufficient time to modify an ACL or group, thereby creating possible security breaches by un-authorized resource access. Finer granularity of resource access may be required during certain security conditions.

In addition to the above features, an RM may also find it beneficial to establish a policy that forces the object to make a set of selections or provide information, the result of which can then be compared with the policy conditions to either grant or deny resource access. Conditioning access based upon information dynamically obtained from an object provides for a greater level of resource security.

An access control system having the above-identified capabilities is non-existent in the art and is highly desirable.

DETAILED DESCRIPTION OF SOME EMBODIMENTS

Figure 1:
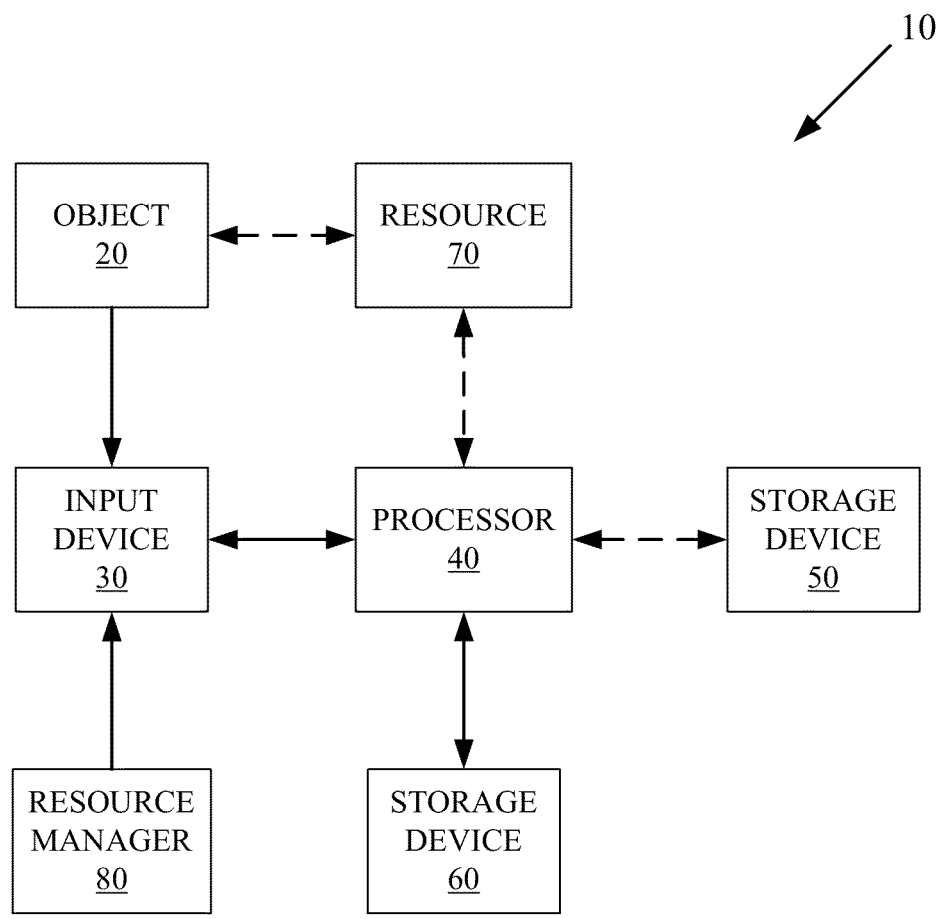
FIG. 1 illustrates an embodiment of a system for implementing the Enterprise Dynamic Access Control System and Method Using an Object Selection Profile.

The embodiments of the system and method discussed herein determine resource access of an object based on the matching of a selected taxonomy of object profile and/or object selection profile and/or environmental and/or complex outcome with those from a selected taxonomy of values from a resource profile (conditions on pre-set policy).

Accurate resource role access by an object is achieved by determining the current state of an object's characteristics (contained in an object profile), environmental statuses, complex outcome, and object selections (contained in an object selection profile) on a real time basis. In various embodiments, the Enterprise Dynamic Access Control System and Method Using Object Selection Profile has the ability to receive an updated object profile, complex outcome, and environmental status, along with an object selection profile (all containing reference inputs), and compare these reference inputs with reference conditions contained in resource profiles to determine resource access.

By way of example, an object's personnel records are queried and compiled into an object profile precisely at the time the object requests access to a resource role and is evaluated by the system, including evaluation of the object selection profile, environment status, and complex outcomes. An event such as: 1) an object profile change such as an object characteristic-change in job title or security clearance; 2) an environmental status change, such as time, date, threat condition, work progress; 3) a complex outcome change such as a formulated outcome; or 4) an object selection profile such as a selected reference by the object, may affect access to resources on a real time basis.

The following terms are used to describe the Enterprise Dynamic Access Control System and Method Using an Object Selection Profile. The definitions set forth below are representative of the intended meanings as used herein.

The terms "access control role" and "ACR" correlate to a specific resource role to control the level of access to a resource. The ACR may be configured for conditional access by including one or more resource profiles, any of which has to match an object profile, environmental status, or complex outcome, in order to be granted access to a particular resource role. The ACR may also be disabled to prevent particular access to a resource role and can also be configured for anonymous access to allow all object particular access to a resource role.

The term complex outcome means an operation that processes certain reference inputs from an object profile, object selection profile, and environmental status via a formulated calculation and produces a Boolean or complex reference value. Complex outcomes can be customized by a resource manager.

The terms "complex reference category" and "RCcpx" mean a label that is used to distinguish the type of data represented by complex reference values.

The terms "complex reference value" and "rVcpx" mean data representing the result of a complex operation as a function of object profile, object selection profile, and environmental status. By way of example, a complex reference value can represent a variable or a Boolean. Table 1 is an example of a risk assessment complex outcome. The computed risk assessment complex reference value inputs, rVcpx (1-10 in Table 1), are a function of an object profile security clearance reference value inputs and an environmental reference value inputs. As shown, homeland security is the environmental reference category, the environmental reference values are low, guarded, elevated, high, and severe, the object profile reference category is security clearance, and the object profile reference values are top secret, secret, and confidential. An example complex calculation (or operation) that produces a complex reference value (in this case a variable vs. a Boolean) is as follows: security clearance∩homeland security=risk assessment.

TABLE 1

| Homeland Security (RCenv) | | | | | |
|---|---|---|---|---|---|
| Security Clearance (RCobj) | Low (rVenv) | Guarded (rVenv) | Elevated (rVenv) | High (rVenv) | Severe (rVenv) |
| Top Secret (rVobj) | 1 | 2 | 3 | 4 | 5 |
| Secret (rVobj) | 5 | 6 | 7 | 8 | 9 |

TABLE 1-continued

| Homeland Security (RCenv) | | | | | |
|---|---|---|---|---|---|
| Security Clearance (RCobj) | Low (rVenv) | Guarded (rVenv) | Elevated (rVenv) | High (rVenv) | Severe (rVenv) |
| Confidential (rVobj) | 6 | 7 | 8 | 9 | 10 |

The term "computer" means any device capable of processing information to produce a desired result.

The term "environmental" means data representing non-object references that can dynamically change with time. Environmentals include environmental reference categories and corresponding environmental reference values.

The term "environmental status" represents data consisting of an environmental state from an external device or system such as an environmental interface (or sensor). By way of example, an environmental status may be data representing A time-of-day such at 1500 EST, a specific date such as Sep. 1, 2002, a process status such as the planning stage, a Homeland Security Level such as Severe, or a weather state such as rainy day.

An environmental status that has been processed and formatted by the Structure Format Service is referred to as an "environmental reference value" or "rVenv" or an environmental reference input.

The term "environmental reference category" and "RCenv" mean a label that is used to distinguish the type of data represented by environmental reference values. Table 2 illustrates the association between environmental reference values and categories, with all distinguished named values such as: ou=1500, ou=EST, o=non GMT being environmental reference values, rVenv.

TABLE 2

| Environmentals | |
|---|---|
| Reference Categories (RCenv) | Reference values (rVenv) |
| Time | ou = 1500, ou = EST, o = non GMT |
| Process status | ou = planning, ou = execution, ou = testing, ou = cut-over, o = Construction Project status |
| Date | ou = 1st, ou = Sept, o = CY |
| Security Level | ou = Severe, o = Homeland Security Level |
| Weather state | ou = rainy, ou = location, ou = time, o = forecast |

The term "computer-readable storage medium" means a physical material in or on which data may be represented wherein the data can be read by an input unit for storage, processing, or display.

The term "memory" means a device where information can be stored and retrieved. Memory may refer to external storage such as disk drives or tape drives. Memory may also refer to semiconductor storage directly connected to a processor such as RAM, DRAM, EEPROM, EPROM, flash memory, PROM, RAM, or ROM.

The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. The use of the term "module" indicates reference to such software modules or implementations thereof. The terms "module" and "software module" can be utilized interchangeably with one another to describe the same element or feature.

The term "object" means anything that requires access to a resource. An object can represent a user, software application, or another resource.

The term "object profile" means data representing a list of object reference values corresponding to the characteristics of an object. An object profile contains no more than one object reference value per object reference category. An object profile is classified as a reference input.

Table 3 illustrates an example of an object profile, with all distinguished named value such as: ou=GS2, ou=GS1, ou=paygrade, o=Enterprise being object profile reference values, rVobj.

TABLE 3

OBJECT PROFILE

| Reference Categories (RCobj) | Reference values (rVobj) |
| --- | --- |
| Paygrade | ou = GS2, ou = GS1, ou = paygrade, o = Enterprise |
| Clearance | ou = secret, ou = confidential, ou = fouo, ou = Clearances, o = Enterprise |
| Command | ou = N661, ou = N66, ou = N6, ou = COMPACFLT, ou = Command, o = CPF |
| BilletTitle | ou = Developer, ou = BilletTitle, o = Enterprise |
| Branch | ou = Dod, ou = Branch, o = Enterprise |

The terms "object reference category" and "RCobj" are labels that are used to distinguish the type of data represented by object reference values. By way of example, object reference categories may be "security clearance", "paygrade", "job function", "employer", or "organizational group."

The terms "object reference value" and "rVobj" mean data representing an object characteristic. By way of example, an object reference value may be data representing an object's security clearance, paygrade, job function, employer, or organizational group.

Figure 14:
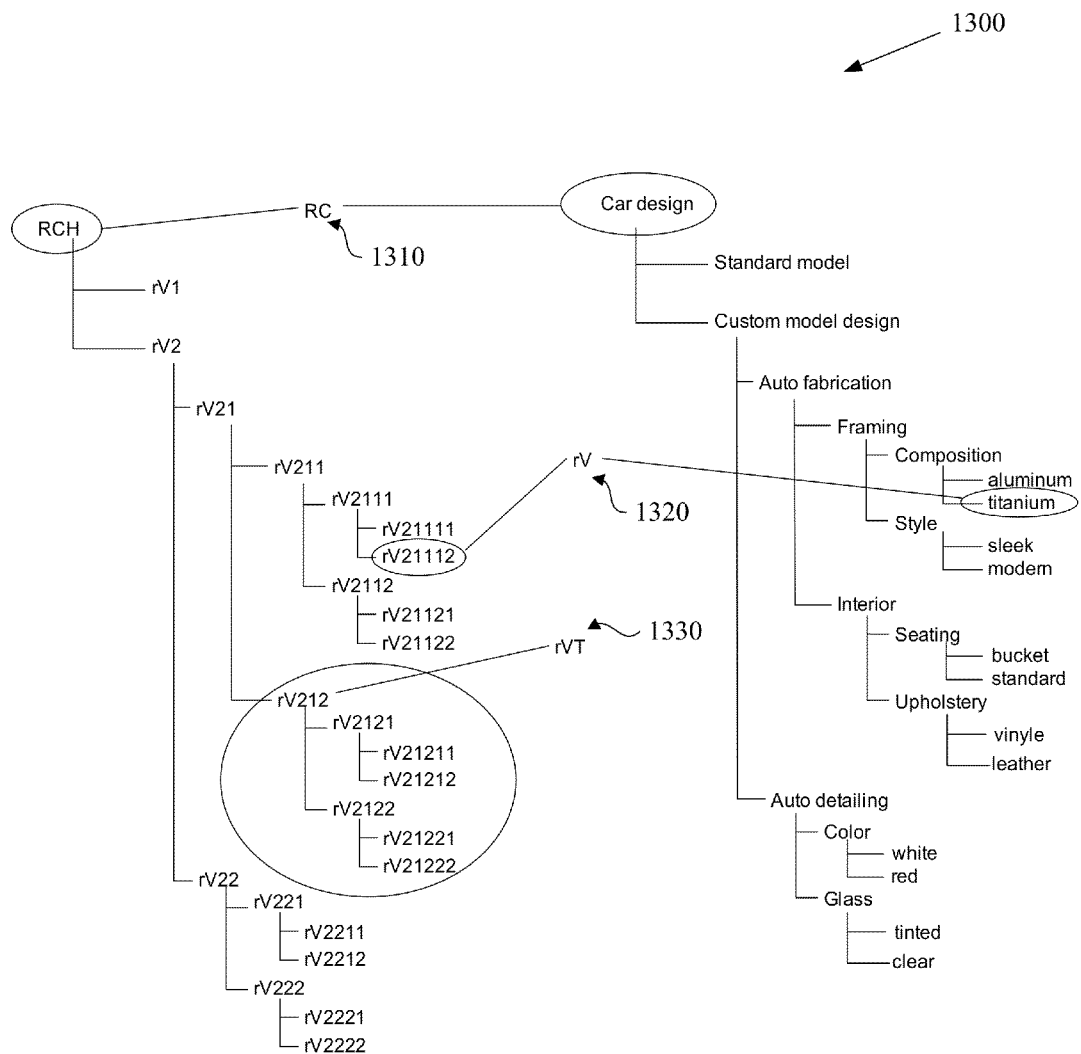
FIG. 14 illustrates an example of established references in a customer meta-database.

The term "object selection profile" refers to "object selection reference values" or "rVobjsel" from the customer metadatabase (CMD) by the Object. FIG. 14 represents the CMD references an object uses to create various object selection profiles as shown in FIGS. 16A-16F. An object can create any number of object profile selections to be evaluated by the rules engine service. Unlike the object profile, an object selection profile can contain multiple rV(s) belonging to an associated reference category (RC). For example, the object selection profile 2 in FIG. 16B, the object selection profile 3 in FIG. 16C, and the object selection profile 4 in FIG. 16D contain two (2) rVobjsel belonging to the same RCobjsel (referred to as "Car Design").

The term "processor" means the computational and control unit of a computer; a device that interprets and executes instructions.

The term "reference" means data used to describe objects, environmentals and complexes. References consist of reference categories (RC) and corresponding reference values (rV). References can also consist of a hierarchy or list structure, which can be evaluated for inheritance of permissions to allow or deny resource access. References can be represented in distinguished name (DN) format, typically used in Lightweight Directory Access Protocol (LDAP) version 3 directory services, Extended Markup Language (XML) tag library or in an object oriented language structure.

The term "reference condition" means the conditions that are selected by a resource manager to establish criteria for an object to access a resource. Reference conditions may consist of object profiles, object selection profiles, environmental and complex reference values. Reference conditions may include one or more reference values per reference category and may also include reference value sub-trees per reference category.

The term "reference inputs" refers to reference values from an object profile, object selection profile, environmental status, or complex output. Reference inputs include a single reference value per reference category, except for object selection profile reference inputs.

The term "resource" means any asset that requires security validation such as electronic data, software applications, web services, or the contents of a physical drawer or safe.

Figure 15:
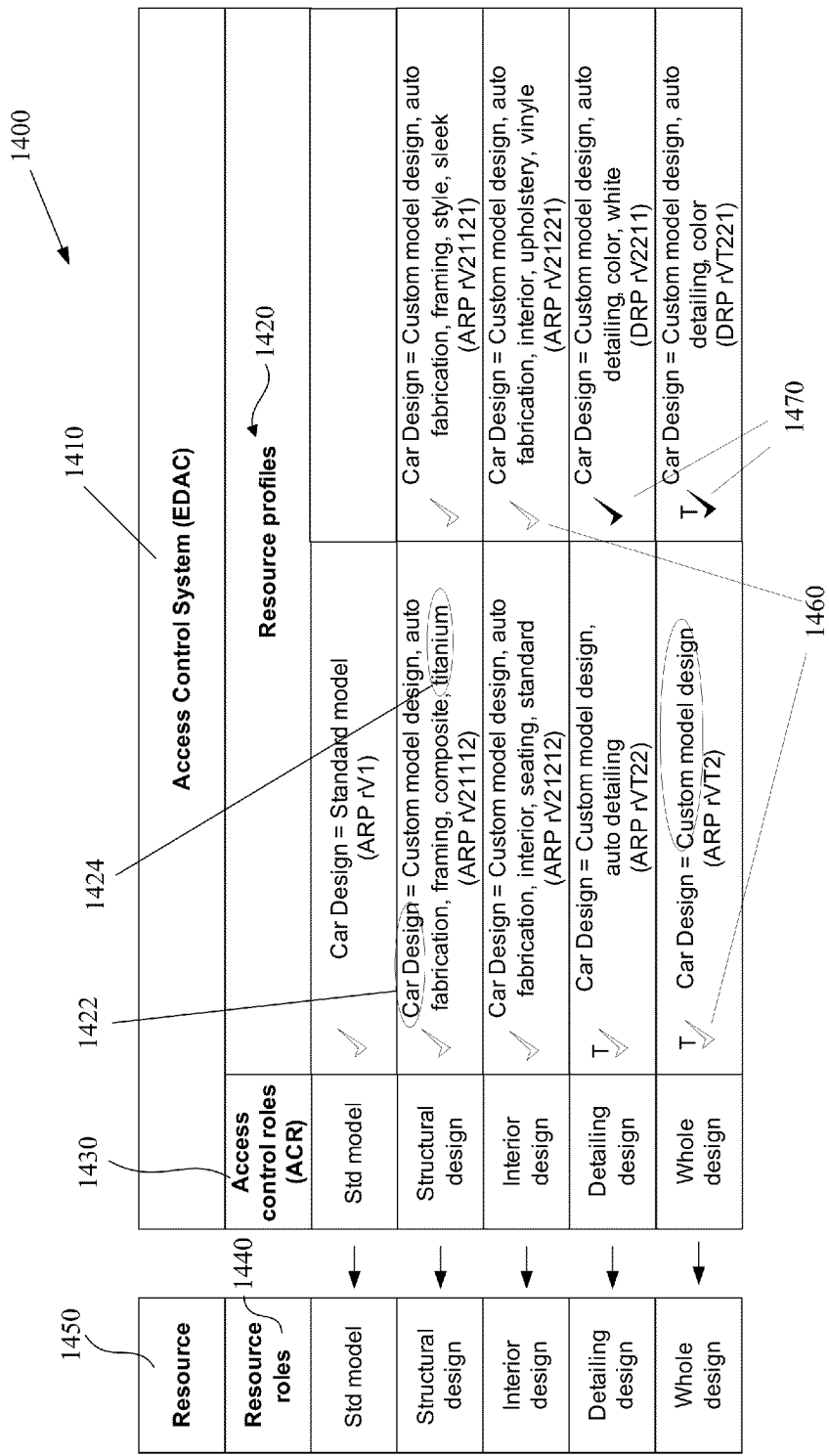
FIG. 15 illustrates an example of a resource profile correlating access conditions to resource roles.

The term "resource profile" represents conditions based on object profiles, object selection profiles, environmental status, and/or complex outcomes that are evaluated by the rules engine service to determine an object access to resource role(s). A resource profile can either be designated as an allow resource profile (ARP) or a deny resource profile (DRP). A resource profile contains data representing the minimum reference values necessary to access the resource. The resource profile may include data representing the minimum object, environmental or complex reference value conditions necessary to access the resource. FIG. 15 and Table 4 below illustrate examples of a resource profile in accordance with the Enterprise Dynamic Access Control System and Method Using an Object Selection Profile.

TABLE 4

RESOURCE PROFILE

| Reference Categories (RCobj) | Reference values (rVobj) |
| --- | --- |
| Paygrade | ou = GS2, ou = GS1, ou = paygrade, o = Enterprise |
| Clearance | ou = secret, ou = confidential, ou = fouo, ou = Clearances, o = Enterprise |
| Command | ou = N651, ou = N65, ou = N6, ou = COMPACFLT, ou = Command, o = CPF |

The term "resource role" means the privileges associated with a particular resource, such as: administrator, user, or guest.

FIG. 1 illustrates an embodiment of a system 10 in accordance with the Enterprise Dynamic Access Control System and Method Using an Object Selection Profile. System 10 includes an object 20, an input device 30, a processor 40, storage devices 50 and 60, a resource 70, and a resource manager 80. Processor 40 is operatively connected to input device 30, storage devices 50 and 60, and resource 70, such as via a wired, wireless, or networked connection. In some embodiments, processor 40 is operatively connected to resource 70 via a network, such as a local area network or the Internet. Similarly, in some embodiments processor 40 is operatively connected to storage device 50 via a network. In some embodiments, input device 30, processor 40, storage devices 50 and 60, and resource 70 reside in the same machine, such as a computer. In some embodiments, storage device 50 may be a remote or networked storage device. In some, embodiments, object 20, resource manager 80, input device 30, processor 40, storage devices 50 and 60, and resource 70 each reside in the same machine, such as a computer. In some embodiments, resource 70 belongs to a customer and does not reside in the same location as object 20, input device 30, processor 40, storage device 60, or resource manager 80, but object 20 may still have access to resource 70.

Object 20 and resource manager 80 can provide input to input device 30. In one embodiment, such input may be provided through the use of an interface with input device 30. For example, resource manager 80 may select conditions for the resource profile through the use of input device 30 and object 20 may provide selections for the creation of the object selection profile through the use of input device 30. However, while input device 30 may be shared by both object 20 and resource manager 80, resource manager 80 has exclusive access to condition manager service (CMS) 108 (shown in FIG. 2) to establish conditions for the resource profile(s). Further, object 20 has exclusive access to the object selection profile manager service 115 (shown in FIG. 2) to establish object selection profiles. Object 20 cannot be given access to CMS 108 due to conflict of interest considerations present in system 10 (i.e. an object cannot be allowed to establish the conditions by which it can gain access).

In operation, object 20 seeks to obtain access to resource 70 by inputting information into input device 30. In one embodiment, such information constitutes the creation of an object selection profile as discussed in more detail below. The object selection profile, which may be stored within storage device 60, is compared, possibly along with an object profile, which may be stored within storage device 50, and/or environmental status and/or complex outcome, both of which may be stored within storage device 50 or 60 or provided to processor 40 in real-time, to resource profile(s) which may also be stored within storage device 60. Use of storage devices 50 and 60 may be beneficial in system configurations where certain modules, data, or information is under customer control and other modules, data, or information is under system 10 control. In other embodiments, where all modules, data, or information is under system control, only one storage device may be utilized.

The resource profile is a set of conditions created by resource manager 80 by which object 20 will or will not gain access to resource(s) 70. Depending upon the results of the comparison, processor 40 will grant or deny object 20 access to resource 70. In some embodiments, processor 40 makes the access control determination based upon input received via many software services 132 (shown in FIG. 2) which may, in some embodiments, be stored as modules within processor 40 and/or stored as modules within storage device 60 and provided to processor 40 in real-time.

Figure 2:
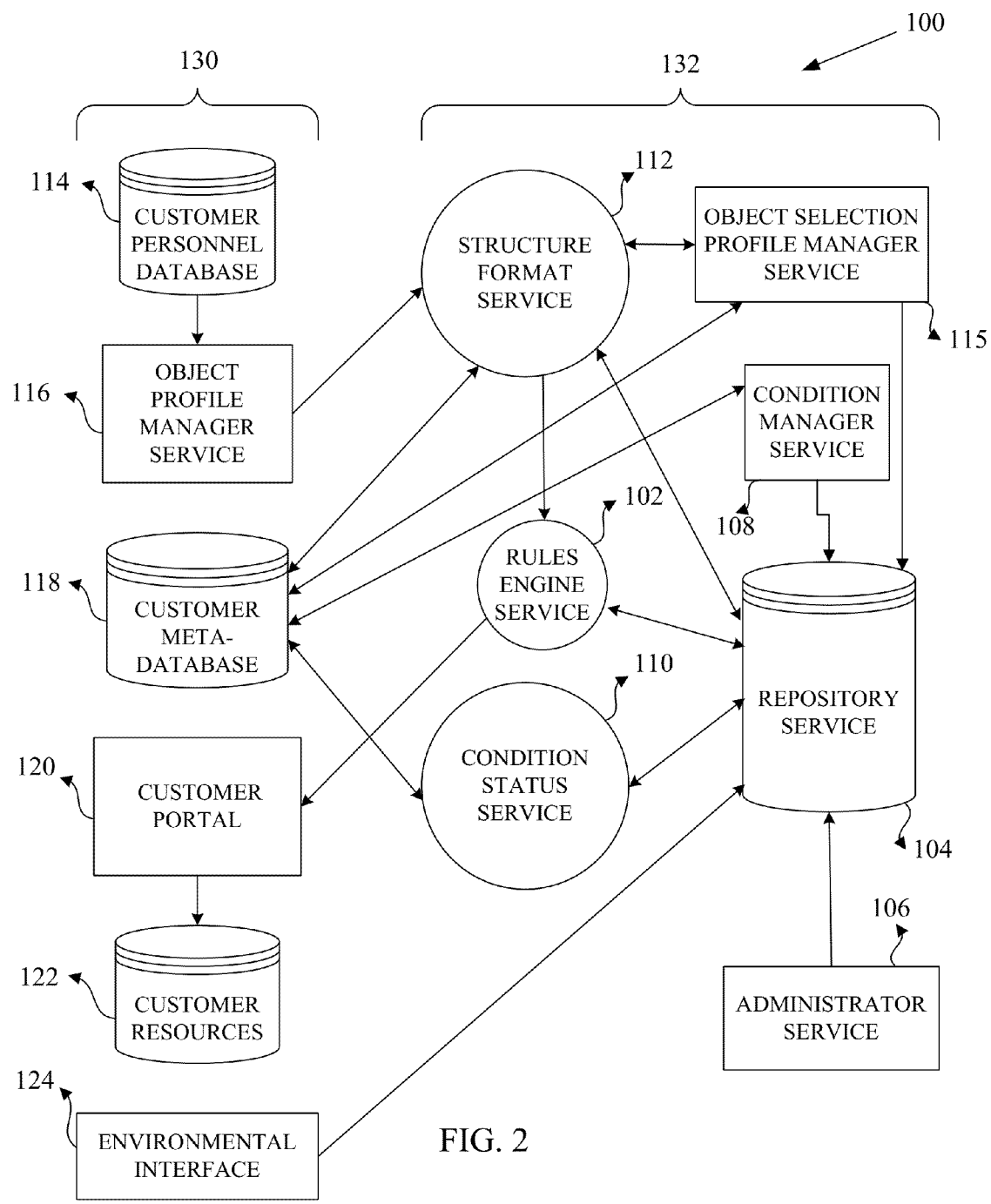
FIG. 2 illustrates an embodiment of a system architecture for implementing the Enterprise Dynamic Access Control System and Method Using an Object Selection Profile.

FIG. 2 illustrates an embodiment of a system architecture 100 in accordance with the Enterprise Dynamic Access Control System and Method Using an Object Selection Profile. In system architecture 100, a resource manager is first authenticated by the administrator service 106. Upon successful authentication the resource manager establishes resource access conditions (or resource profiles) by accessing customer meta-database (CMD) 118 via the condition manager service 108. These resource profiles are then stored in the repository service 104. The reference conditions on the resource profiles and CMD 118 are routinely compared by the condition status service 110 to validate synchronized taxonomy. Whenever an object tries to acquire resource access to a customer portal 120 and customer resources 122, an object profile can be instantiated via the customer personnel database (CPD) 114, object profile manager service 116, and the structured format service 112. An object selection profile may also be required in order to grant resource access. Under this circumstance, an object would access the object selection profile manager service 115, and create an object selection profile, which when created, may be stored in the repository service 104. Just like object profiles, object selection profile, environmental statuses and complex outcomes are formatted via structured format service 112 and CMD 118.

In some embodiments, in order for an object to be granted resource access, the rules engine service 102 compares one or more or any combination of the object profiles, object selection profile(s), environmental statuses, and complex outcomes with the resource profiles. In other embodiments, the object profile, object selection profile(s), environmental statuses, and complex outcomes are compared with the resource profiles.

System architecture 100 further includes customer provided assets 130 and access control software services 132. Customer provided assets include CPD 114, object profile manager service 116, CMD 118, customer portal 120, customer resources 122, and environmental interfaces 124. As an example, CPD 114, CMD 118, and object profile manager service 116 are maintained and operated by the customer, and as such, may be stored within storage device 50 shown in FIG. 1, with object profile manager service 116 being stored as a module therein.

CPD 114 is a customer provided database that contains personnel data or characteristic values about employees, such as their pay grade, job description, organizational assignment, etc. The object profile manger service 116 is for querying CPD 114 in order to present objects with a list of object profiles. CMD 118 is a customer provided data store that contains data (or references) used to establish conditions for resource access. The data contained in CMD 118 represents corporate characteristics, such as pay, job description, organization structures, environmental states and complex outputs. Customer portal 120 is the interface with rules engine service 102 such that accessible resources and roles may be listed. Customer resources 122 may include resources, such as software applications, web services, cipher locks, etc. Environmental interface 124 is for furnishing software resources 132 with environmental updates from prevailing security levels, current time, date, or weather status.

Access control software services 132 include rules engine service 102, repository service 104, administrator service 106, condition manager service 108, condition status service 110, object selection profile manager service 115, and structure format service 112. Each of the aforementioned software services 132 may be implemented as a module or a series of modules, either functioning alone or in concert with physical electronic and computer hardware devices. As an example, software services 132 are stored as modules within either processor 40 or storage device 60 shown in FIG. 1. Such modules may be utilized separately and/or together locally and/or remotely to form a program product thereof, that may be implemented through non-transitory media. Operation of the modules will be discussed in more detail with respect to the system and method described herein. The method described herein may be implemented as a program product comprised of a plurality of such modules, which can be interactively displayed for a user on a display screen of a data-processing system (e.g., computer). Such interactivity may be provided by a specialized graphical user interface, which, for example, may be incorporated into input device 30 shown in FIG. 1.

Rules engine service 102 is for comparing reference input and reference conditions to determine resource access. Repository service 104 is for storing reference conditions (contained in resource profiles) as well as storing reference inputs (contained in object selection profiles and complex outcomes) that are later retrieved by the rules engine service 102 in order to determine resource access. Repository service 104 may also contain resource manager accounts, customer meta-database referrals and log events. Administrator service 106 is for performing configuration management on repository service 104. Condition status service (CSS) 110 is for comparing resource profile reference conditions stored in repository service 104 with the references contained in CMDs. If reference conditions stored in repository service 104 cannot be located in any CMD, then CSS 110 classifies the reference conditions as deprecated and not evaluated by the rules engine service 102. If the reference conditions belong to an off-line CMD, then CSS 110 classifies the reference conditions as unreachable and also not evaluated by rules engine service 102. Deprecated and unreachable reference conditions are flagged in condition manager service 108.

Structure format service 112 is for converting all reference inputs into a structured format, such as, distinguished name for LDAP directory services, XML or object oriented structure. The object selection profile manager service 115 is used by the object to select input references from CMD 118 in order to create an object selection profile, whose profile can be stored in the repository service 104 for processing by the rules engine service 102. It should be noted that the object selection profile manager service 115 is used as a generic term for any way to select one or more object selection reference inputs and package them into an object selection profile, so long as the object, not the resource manager, creates the object selection profile. The resource manager establishes the object selection profile reference conditions used inside resource profile by using CMS 108.

A resource manager (RM) is assigned the responsibility to establish conditions (resource profiles) to determine resource access. Specifically the RM uses CMS 108 that accesses the CMD 118, to establish resource profiles. These resource profiles can contain any combination of: object profile, object selection profile, environmental, or complex reference conditions. RM's should have a knowledge base that includes: security, customer requirements, resource familiarity, and management policies.

Figure 3:
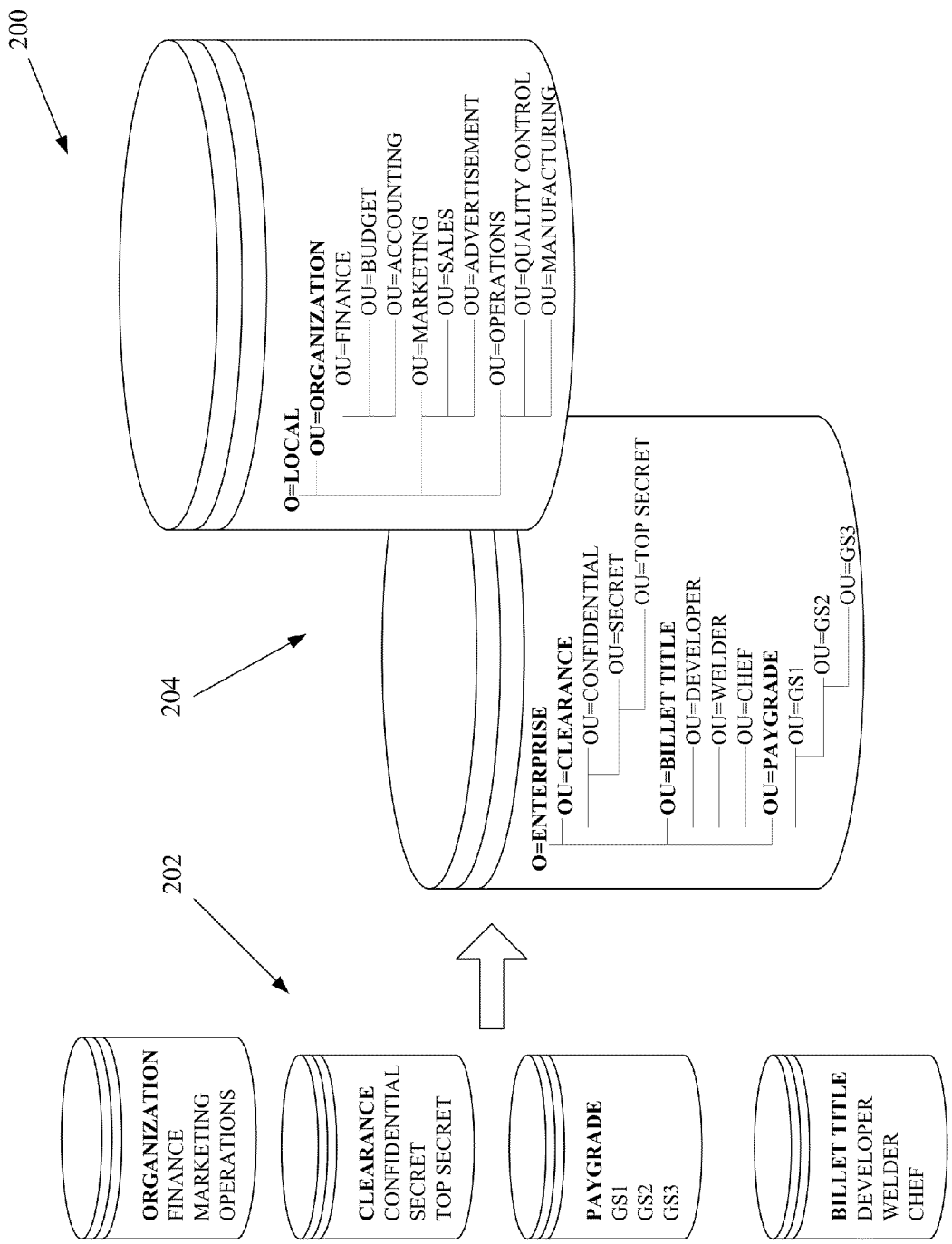
FIG. 3 illustrates a customer personnel database and a customer meta-database.

FIG. 3 illustrates CPD 202 and CMD 204. CMD 204 provides RMs a synchronized, centrally managed and reliable data store by which to select conditions to access resources. A CMD can be an LDAP v3 compliant directory service or a relational database. Most organizations store information about employees and the organization in relational databases, identified as CPD 202. The data from CPD 202 is transposed to a structured format and placed in customer meta-database 204. CMDs are owned, maintained and operated by the customer. Although FIG. 2 only illustrates object references, CMD 204 can contain environmental and complex references. Also, CMD 204 illustrates references stored in a directory service in distinguished name (DN) format to illustrate a hierarchical structure. However, it is recognized that the references could be stored in another type of structured format besides a directory service, such as XML or object-oriented format.

Figure 4:
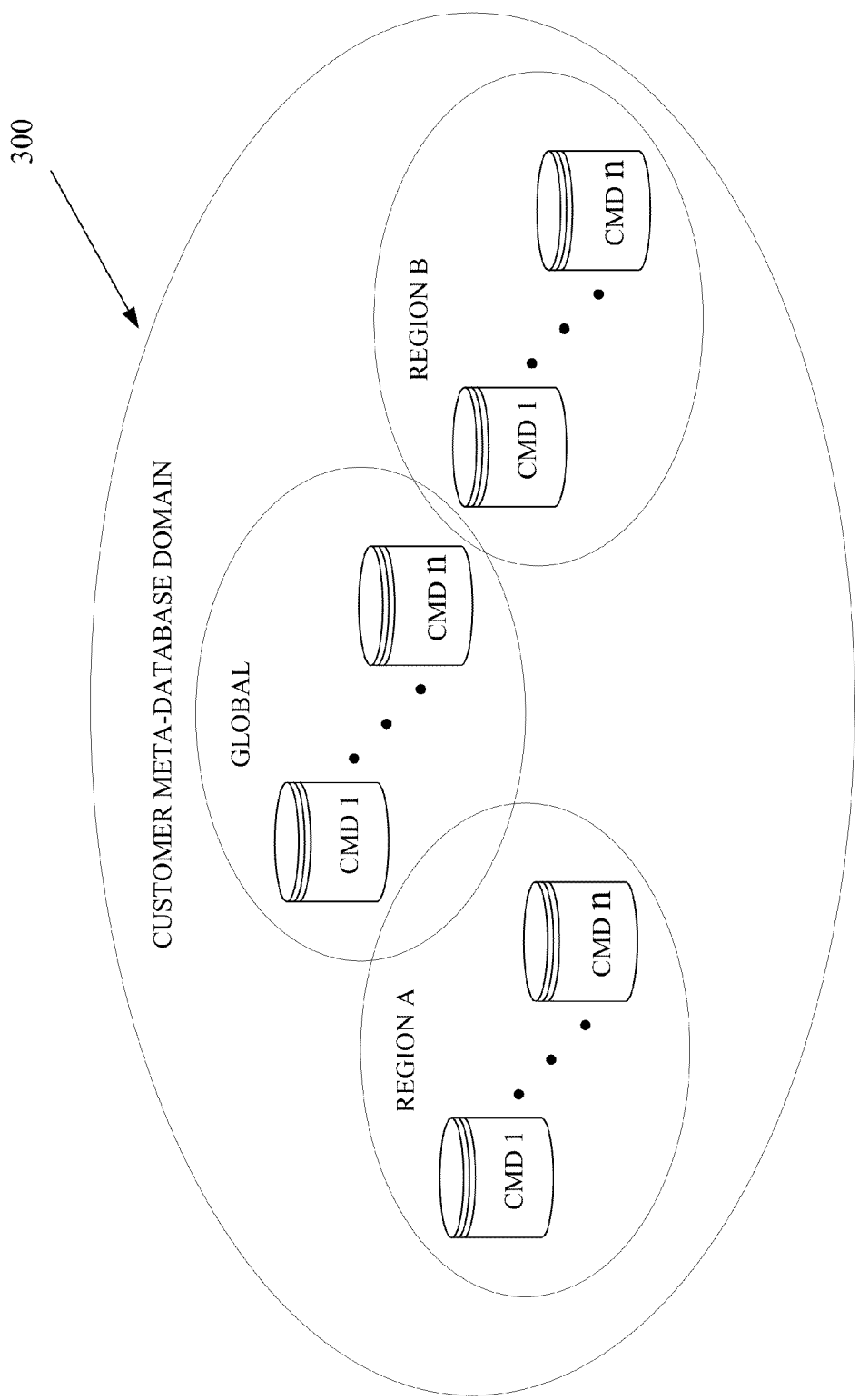
FIG. 4 illustrates the domain of customer meta-databases.

The domain 300 of CMDs, as illustrated in FIG. 4, shows that references can be distributed among many CMDs and managed by various organizations. References can be maintained locally or globally within a community of interest or domain. As shown in FIG. 3, an organization may include regional CMDs at different locations, while a headquarters location manages the global CMD. Regional CMDs could reflect local references and could be managed locally. A central CMD could reflect global references and be managed at a headquarters.

Figure 12:
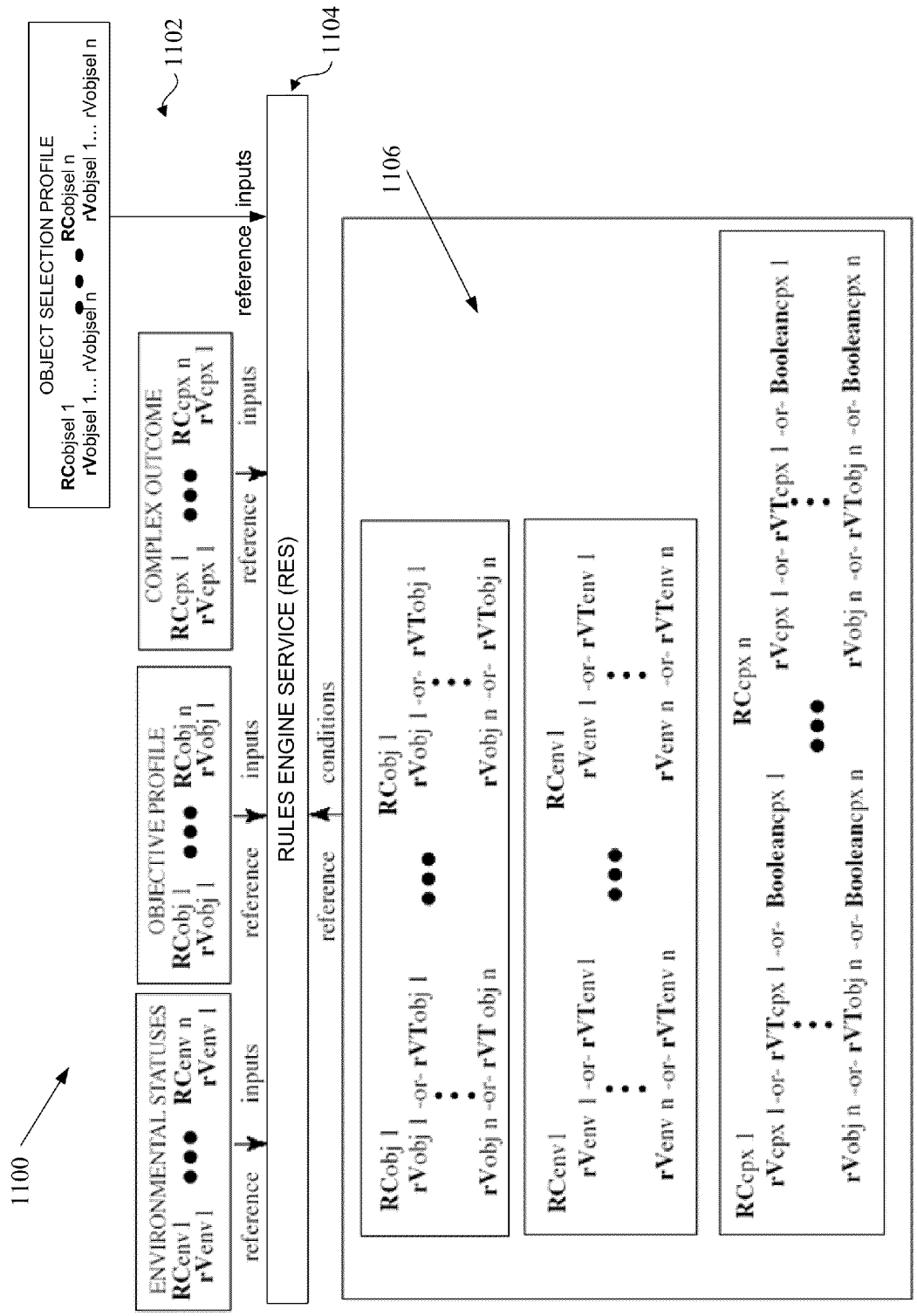
FIG. 12 illustrates how the rules engine service compares reference conditions contained in resource profiles and reference inputs from objects, environmental, and complex outcomes.

Referring now to FIG. 12, FIG. 12 is a functional block diagram illustrating rules engine service 1104. Rules engine service 1104 serves to evaluate reference inputs 1102 and reference conditions 1106. Reference inputs 1102 include environmental statuses, object profiles, object selection profiles, and complex outcomes. Although FIG. 12 shows rules engine service 1104 as receiving four different types of reference inputs, it is recognized that, in addition, a single reference input or combination of any four types of reference inputs may be received by rules engine service 1104.

Reference inputs 1102 may include a plurality of reference values and each reference input 1102 may not include more than one reference value for each reference category, except for reference input values in the object selection profile. As an example, an object profile may represent the characteristics of a user named "John_Doe". Included under the John_Doe object profile may be several object reference categories. These sample object reference categories may include "Job type", "Clearance", "Organization", and "Paygrade". The object profile may also include a plurality of object reference values, each corresponding to an object reference category. John Doe's object profile may also include object reference values, such as, program manager, secret, accounting, and GS12.

As another example, an environmental status may correspond to security or weather conditions. As an alternative, environmental reference may correspond to the date or time-of-day. Environmental statuses may include a plurality of environmental reference values where each environmental status may not include more than one environmental reference value for each environmental reference category. By way of example, an environmental status may represent security or weather conditions. Included under these conditions are environmental reference categories. These sample environmental reference categories may include "Homeland Security Advisory" and "Temperature". These environmental reference categories may have corresponding environmental reference values of "severe" and "101 degrees Celsius".

As yet another example, a complex outcome may include a variable or Boolean value. The complex outcome can be produced by a complex operation that evaluates an object profile, object selection profile, and environmental statuses.

As a further example, an object selection profile would contain a profile having car design selections including various standard or custom build options, as shown in FIGS. 16A-16F.

Still referring to FIG. 12, reference conditions 1106 are contained in a resource profile and can contain any combination of object reference values, object reference value sub-trees, object selection reference values, object selection reference value sub-trees, environmental reference values, environmental reference value sub-trees, complex reference values, or complex reference value sub-trees, where one or more reference value conditions, reference value tree can correspond to a reference category condition within a resource profile.

Any particular resource role in the system may be granted access with a corresponding resource profile. By way of example, a resource may include three resource roles: "guest", "user" and "administrator". Each resource profile is assigned an access control role (ACR) that corresponds to a resource role: "guest", "user" and "administrator".

Resource profiles may have two classifications: Allow Resource Profiles (ARP) and Deny Resource Profiles (DRP).

Figure 17:
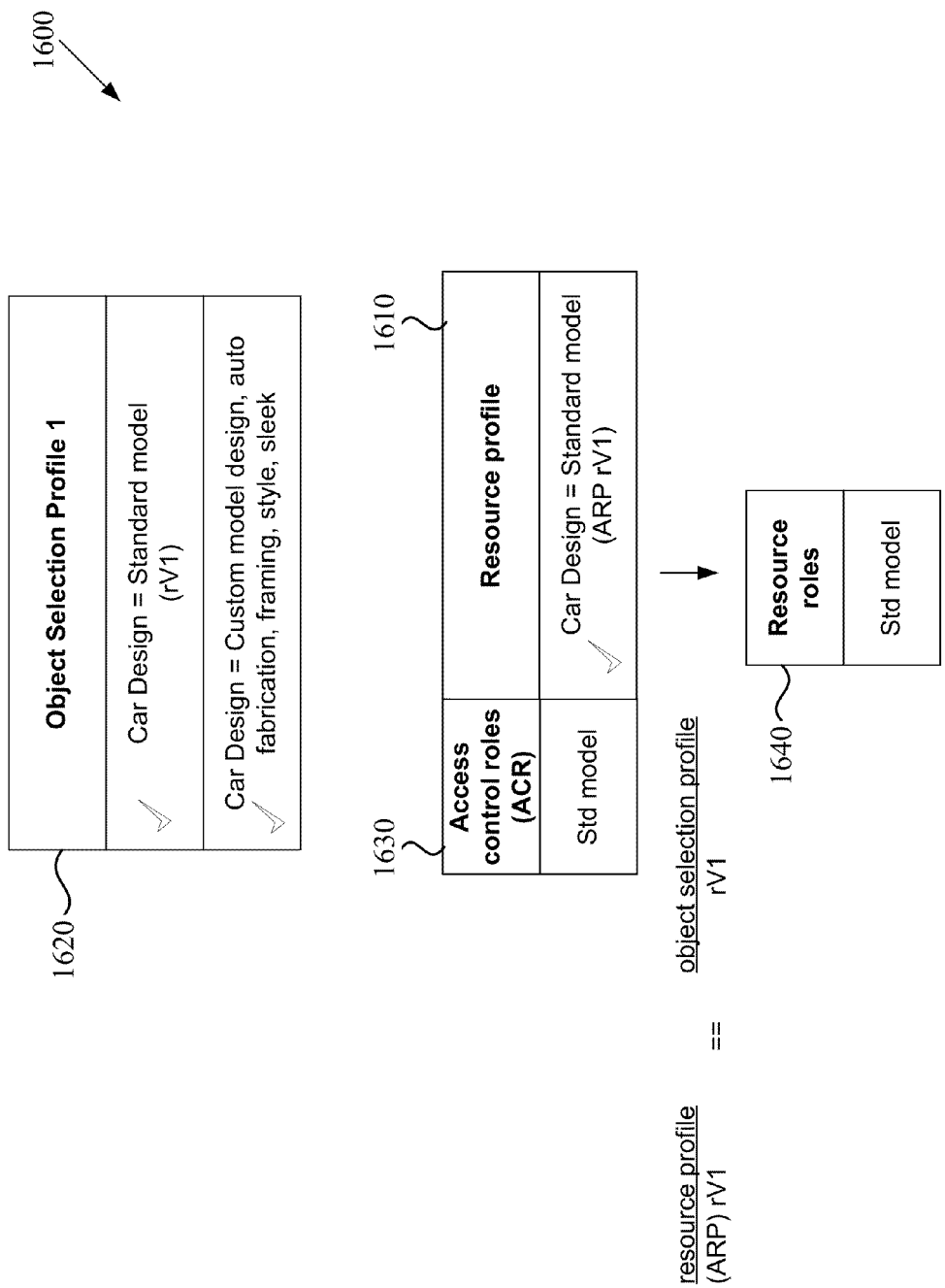
FIGS. 17-22 illustrate examples of the comparison of object selection profiles to resource profiles to determine access to resource roles.
Figure 18:
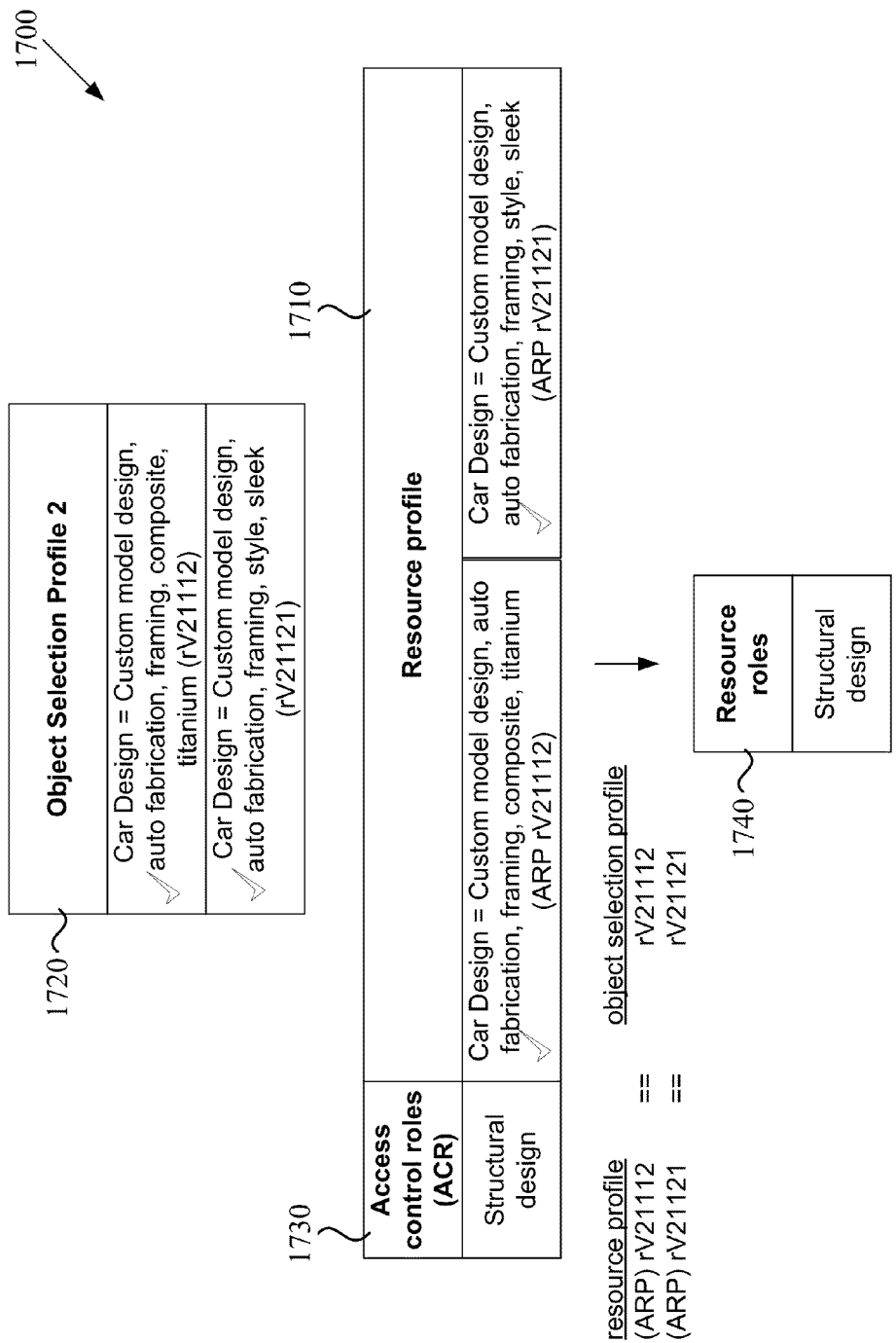

An ARP specifically allows an object a resource role access if all reference inputs match all reference conditions within an ARP, such as shown in FIGS. 17 and 18. A DRP can compliments an ARP and serves as a filter by denying an object resource role access if all reference inputs (from object profile, object selection profile, environmental status, or complex output) match all the reference conditions in a DRP. A DRP can only exist if one of its reference values and/or reference value sub-trees is a child of an ARP reference value sub-tree. Each resource profile may include reference values (represented by a checkmark in FIG. 6) or reference value sub-trees or tree (represented by a checkmark "T" in FIG. 6). By way of example, a resource may include three ARPs for a guest access control role, one ARP for a "user" access control role, one ARP for an "administrator" access control role, and one DRP for denying access for particular "user" and one DRP for denying access for an "administrator" access control roles. It is recognized that any number of resource profiles may be created for a particular resource depending on access control requirements.

Figure 5:
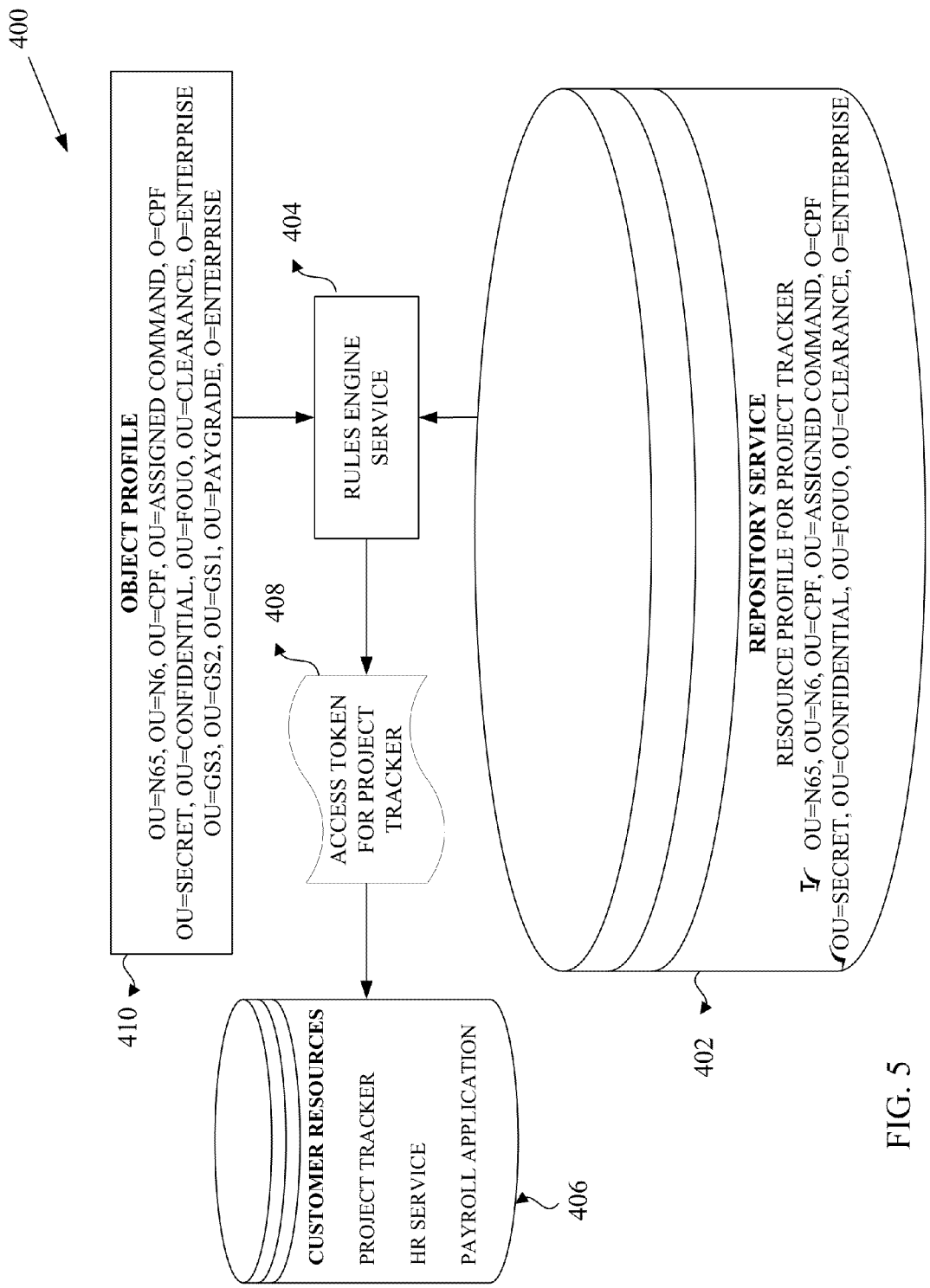
FIG. 5 illustrates an example of an object requesting access to a resource using an object profile.

FIG. 5 illustrates an example of an object requesting access to a resource called "Project Tracker" contained inside a customer resource 400. Rules engine service 404 evaluates an object profile 410 with the Project Tracker resource profile stored inside the repository service 402. For each reference category, within the resource profile, the object profile is included in a reference value or reference value sub-tree contained in the resource profile. In the example of FIG. 5, the resource profile contained in repository service 402 only contains object reference conditions and no environmental or complex references. Object profile 410 contains at least the minimum necessary reference values, as dictated by the resource profile, for access to the project tracker resource. Rules engine service 404 generates access token 408 for granting the object access to the resource role.

Figure 6:
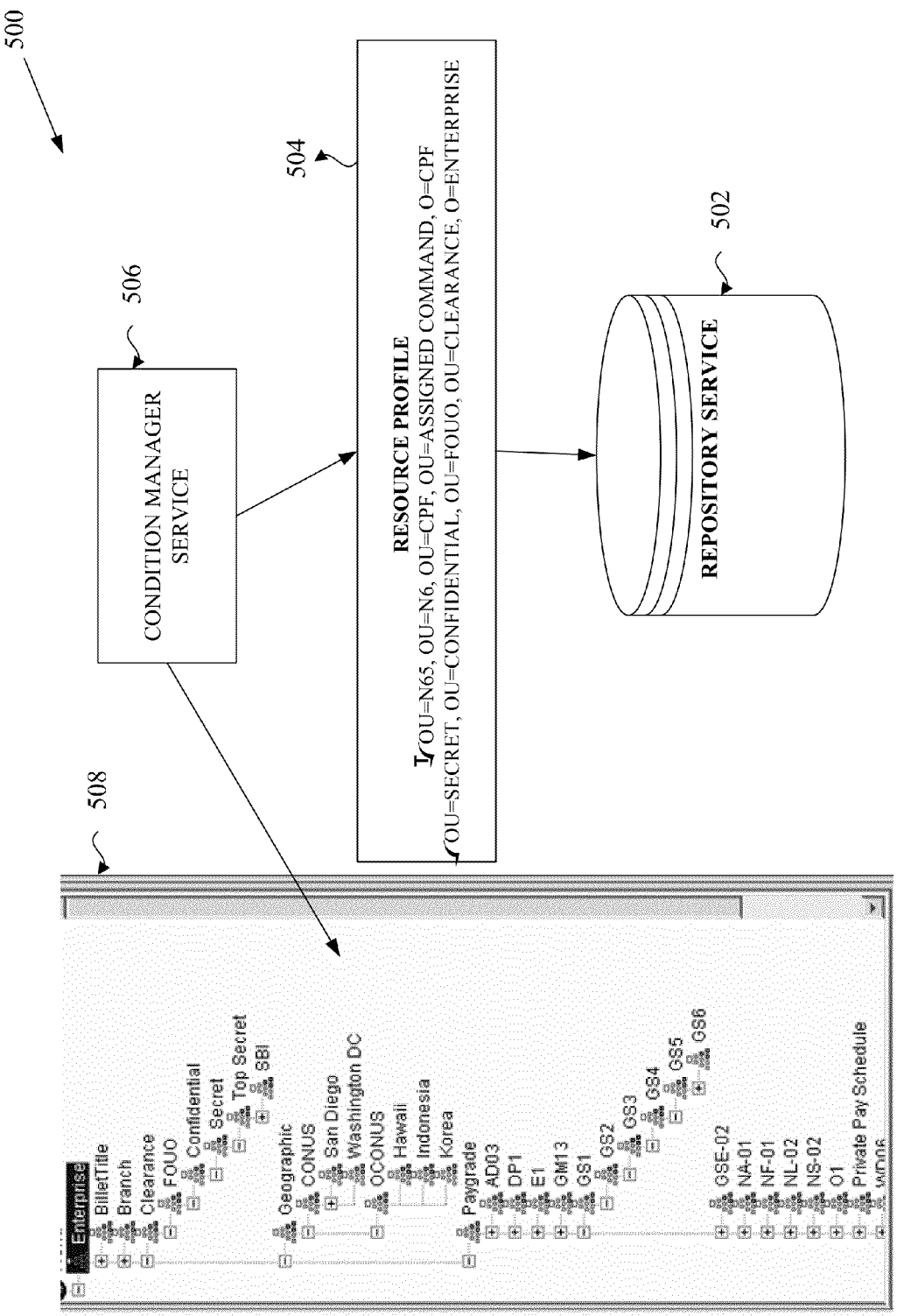
FIG. 6 illustrates an example of a resource manager establishing a resource profile via the condition manager service, which has a view to the customer meta-database.
Figure 8:
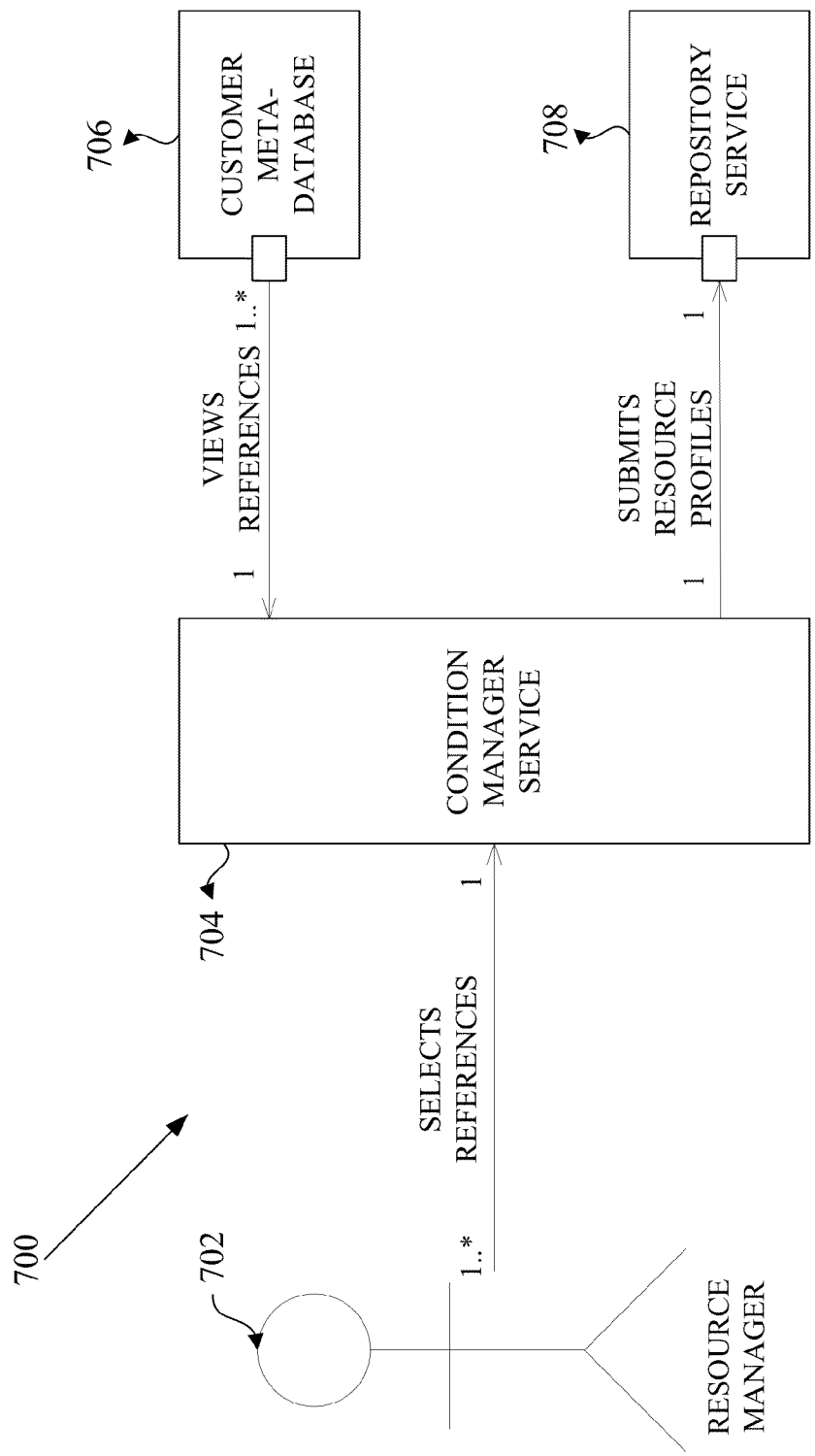
FIG. 8 illustrates the interaction between a resource manager and the condition manager service.

FIG. 8 illustrates a universal modeling language (UML) diagram 700. Condition manager service 704 allows resource managers (RMs) 702 to view and select reference conditions, such as through the use of input device 30 shown in FIG. 1, from various CMDs 706, which may be stored in storage device 50, and submits those resource profile(s) with associated reference conditions to repository service 708, which may be stored within storage device 60. FIG. 6 illustrates an example of an RM (through the use of condition manager service 506) selecting two reference conditions from CMD 508, assigning them to resource profile 504 and submitting them to repository service 502.

Figure 7:
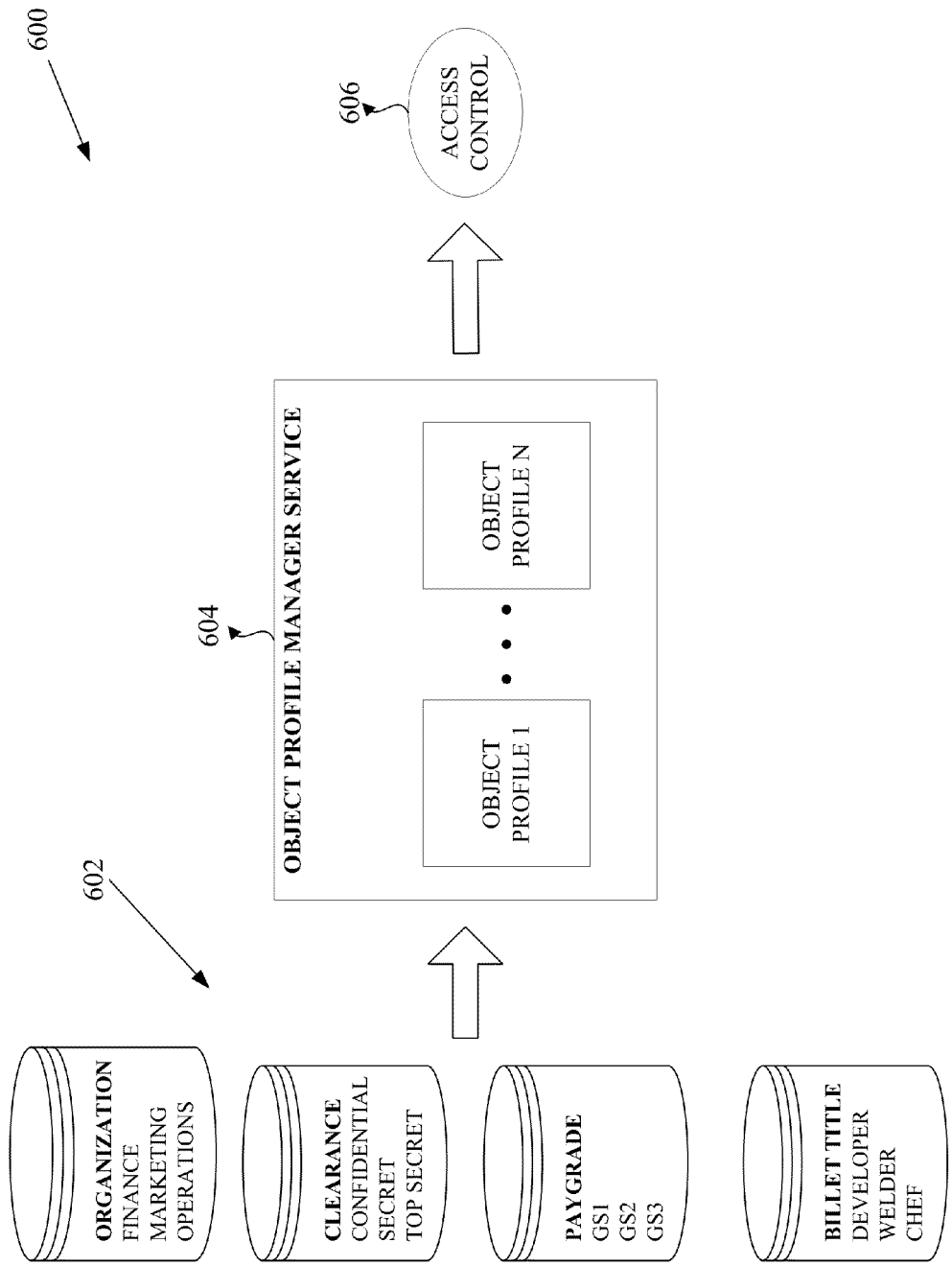
FIG. 7 illustrates the function of an object profile manager service offering an object the selection of various object profiles by which to select one to send to the access control system.

FIG. 7 illustrates a function block diagram of object profile manager service (OPMS) 604. OPMS 604 is a customer managed product. OPMS queries customer personnel databases 602 and aggregate object references into one or more object profile(s) that are selected and then processed by the access control system 606.

Figure 9:
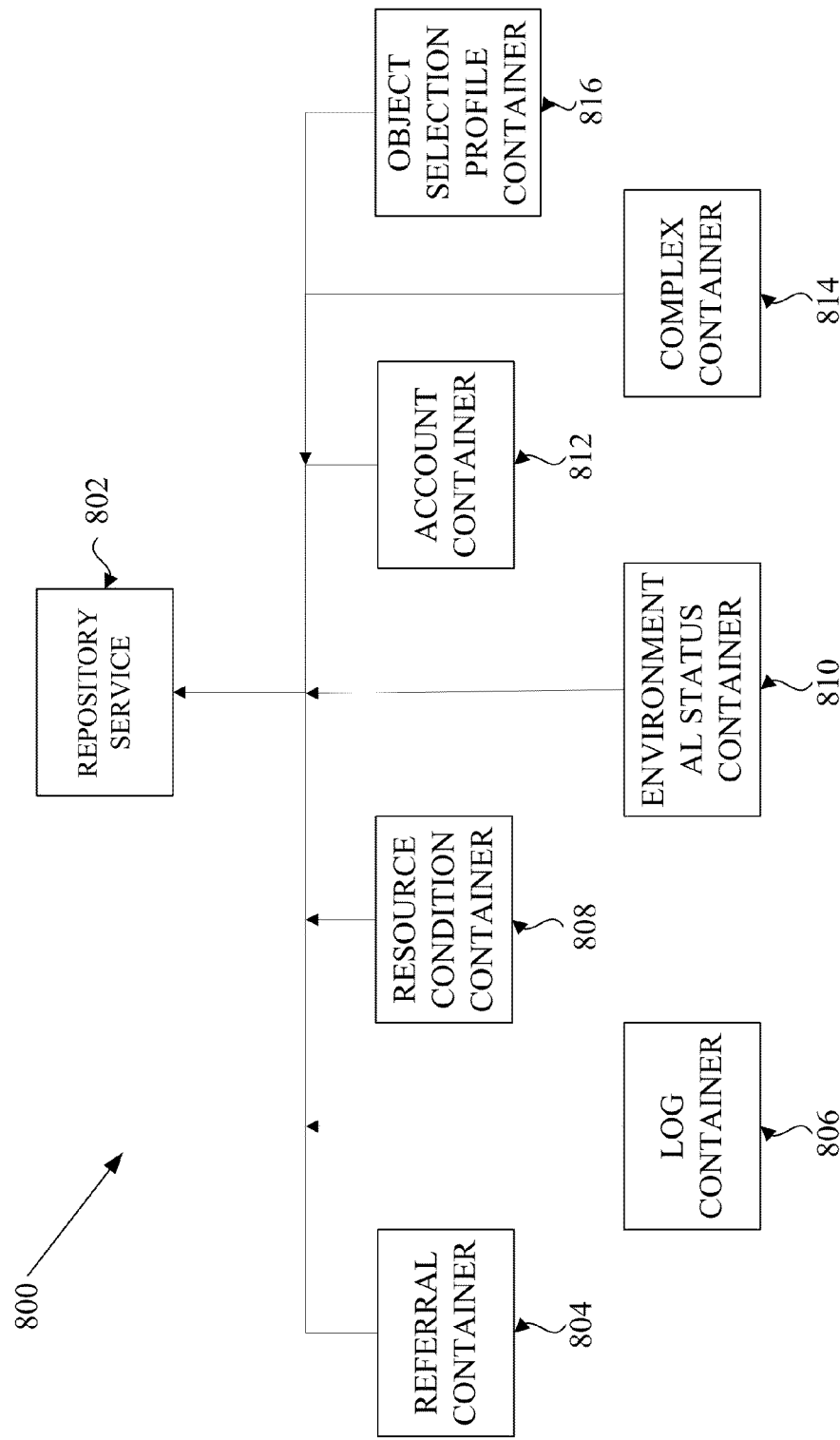
FIG. 9 illustrates an exemplary configuration of the repository service.

FIG. 9 shows a diagram 800 illustrating repository service 802. Repository service 802 is for storing conditions and configuration management. Depending on the content, data will be stored in one of the following six containers: (1) referral container 804 stores parameters to establish connectivity to all domain CMDs; (2) log container 806 stores access control events, such as why and when an object was denied resource access; (3) resource condition container 808 stores reference conditions (or resource profiles) for each resource; (4) environmental status container 810 stores environmental statuses or updates; (5) account container 812 stores resource manager credentials for authentication into the condition manager service; (6) complex container 814 stores complex operations to process reference inputs, such as object profiles and/or environmental statuses; and (7) object selection profile container 816, which stores object selection references.

Administrator service 106, of FIG. 2, performs configuration management functions on repository service 802. Administrator service 106 allows administrators to: (1) manage RM accounts; (2) create resource containers for storage of conditions; (3) manage referral parameters to access CMDs; and (4) create data stores of environmental statuses.

Figure 10:
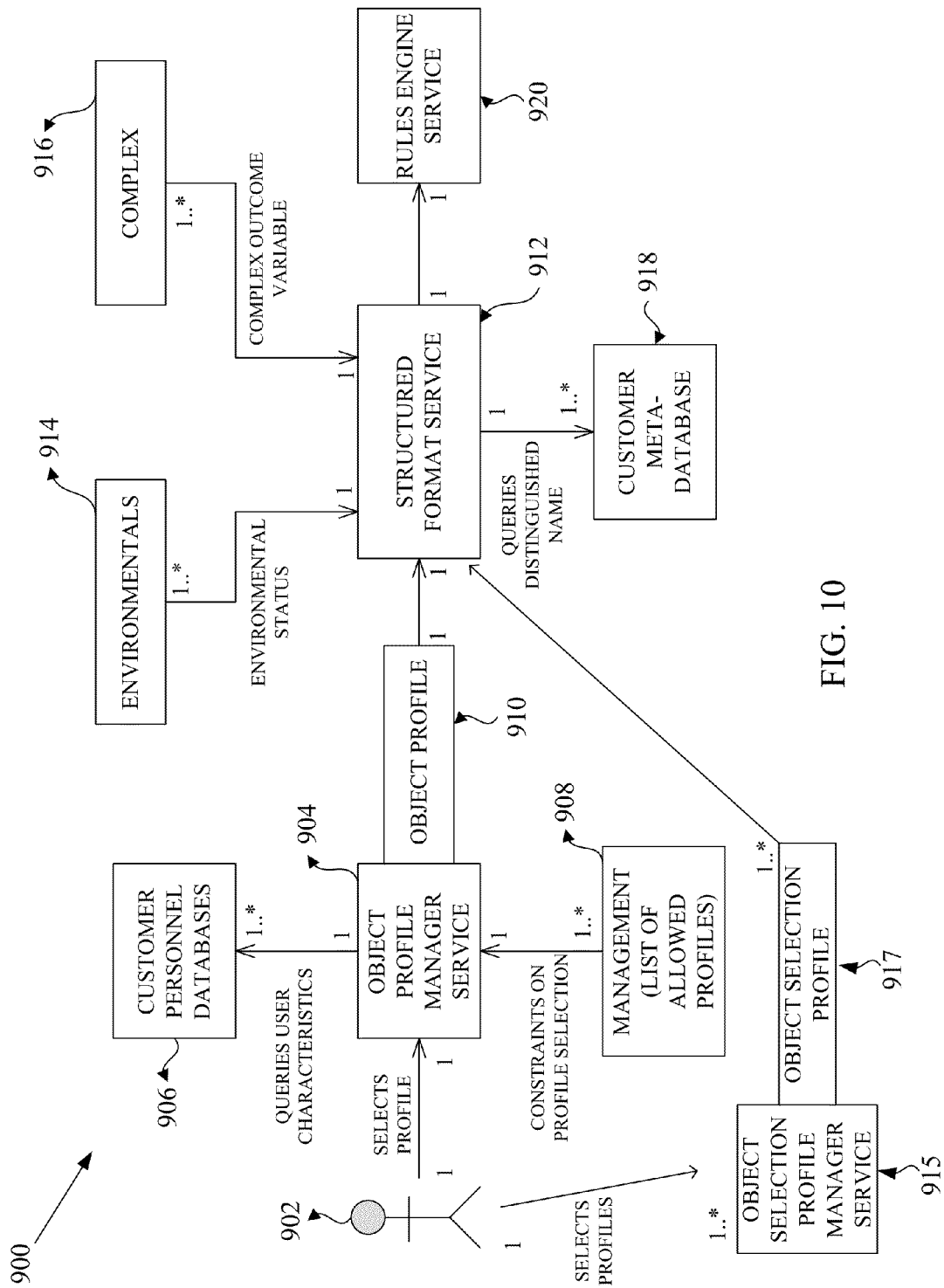
FIG. 10 illustrates how the object profile, object selection profile, environmental status, and complex outcome are processed and sent to the rules engine service.

FIG. 10 is an UML diagram illustrating various aspects of the Enterprise Dynamic Access Control System and Method Using an Object Selection Profile, particularly structured format service 912. Reference inputs such as object profiles, object selection profiles, environmental statuses and complex outcomes, may need to be converted into the same structured format as reference conditions (contained in resource profiles) in preparation for rules engine service (RES) 920 processing. For every reference input value and associated reference input category, structure format service 912 queries CMDs 918 for proper format. The formatted reference input (from 910, 914, 916 or 917) is eventually processed by the RES 920 for comparison among reference conditions. To evaluate for inheritance, reference inputs and reference conditions must be in a structured format. For example, if a reference condition contained the following distinguished name value:

rV: ou=secret, ou=confidential, ou=clearance and an object profile contained the following reference input:

rV: ou=top secret, ou=secret, ou=confidential, ou=clearance then a match would not occur. However, if the reference condition changed to a sub-tree a match would occur because it would represent all values equal or above secret, which includes top secret:

rVT: ou=secret, ou=confidential, ou=clearance

Figure 11:
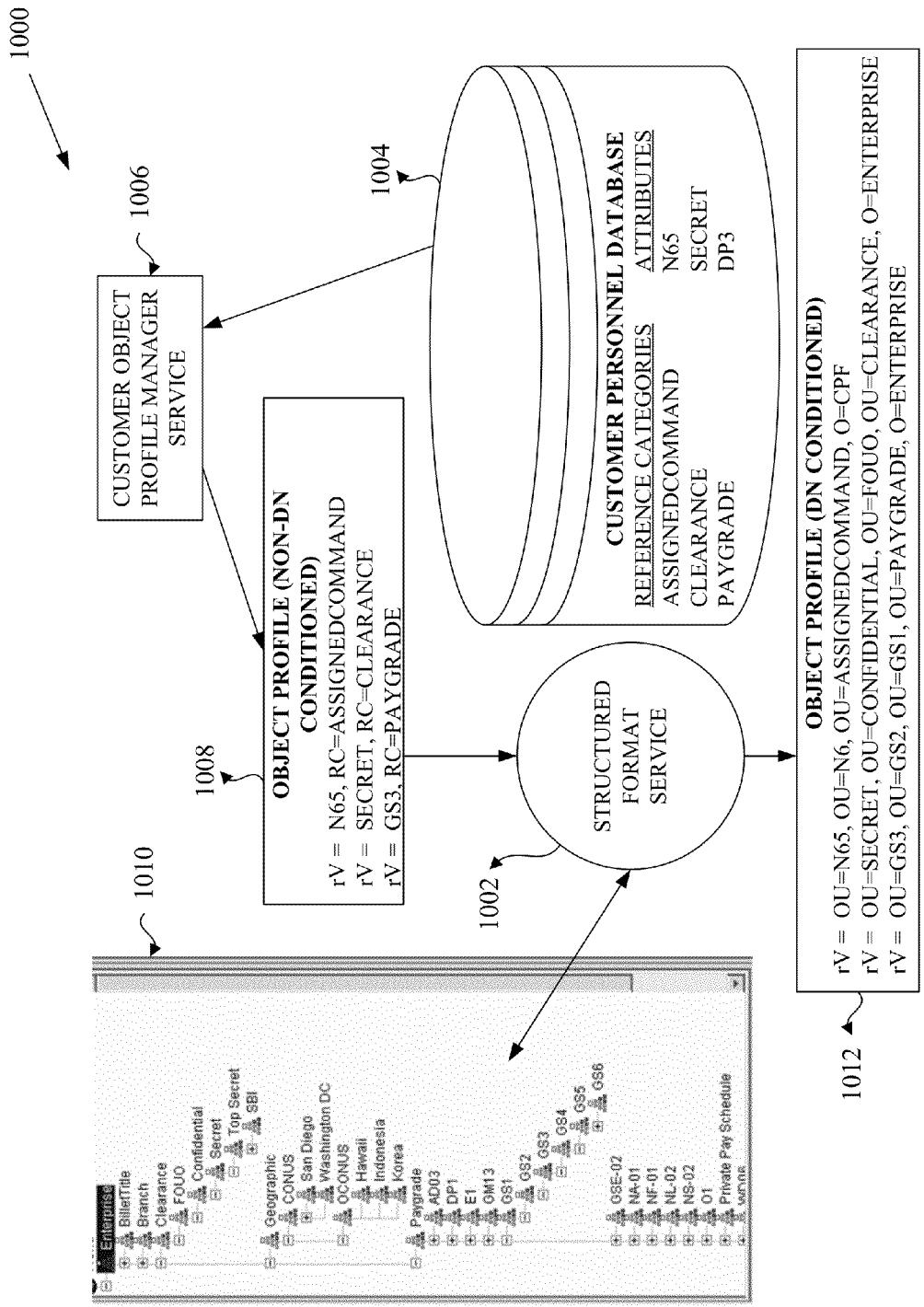
FIG. 11 illustrates an example of an object profile with three reference inputs processed by the structured format service to generate a distinguished name formatted object profile for submission to the rules engine service.

FIG. 11 illustrates an example of object profile 1008 with three reference input values processed by structured format service 1002 to generate a distinguished name formatted object profile 1012 for submission to a RES, such as RES 920 as shown in FIG. 10.

Reference changes in a CMD due to a re-organization, salary re-structure, etc., could affect resource access because a mismatch may occur between a newly created reference input (such as an object profile, environmental status or complex outcome) and a previously established resource condition in a resource profile. For example, a RM establishes a reference condition from an organization structure contained in a CMD. Assume the selected reference condition requires sales permission to access a particular resource:

ou=sales, ou=operations, ou=ACME

Then a re-organization occurs and the sales department is placed under marketing in the CMD:

ou=sales, ou=marketing, ou=ACME

Now, a user from the sales department will acquire the following reference input in their object profile:

ou=sales, ou=marketing, ou=ACME

Because the reference condition was stored with the old structure (under operations), access will be denied. This automated constraint offers security and ensures RMs reconsider access control policies due to corporate changes. Content changes in CMD 118, shown in FIG. 2, could trigger an event in condition status service (CSS) 110 to scan reference conditions in repository service 104. Any mismatches are flagged as deprecated reference conditions in CMS 108. The RM can easily identify the affected conditions and decide to edit or remove the deprecated reference condition(s). CSS 110 can also detect if reference conditions within resource profiles are unreachable. For example, assume a previously selected reference condition:

ou=program manager, ou=job description, o=corporate

If the CMD o=corporate becomes unreachable the structure format service will be unable to add the following reference input to an object profile, even though the object is a program manager:

ou=program manager, ou=job description, o=corporate

The object will be denied resource access because the RES will be unable to find the above reference input in the object profile and match it to the reference condition in the resource profile. CSS 110 will flag these types of conditions as unreachable in CMS 108. Unreachable reference conditions should not be deleted or changed by the RM because CMD 118 may be temporarily off-line.

Therefore, CSS 110 monitors the status of reference conditions. CSS 110 also automates the location and notification of deprecated (or obsolete) or unreachable resource conditions in condition manager service 108.

Figure 13:
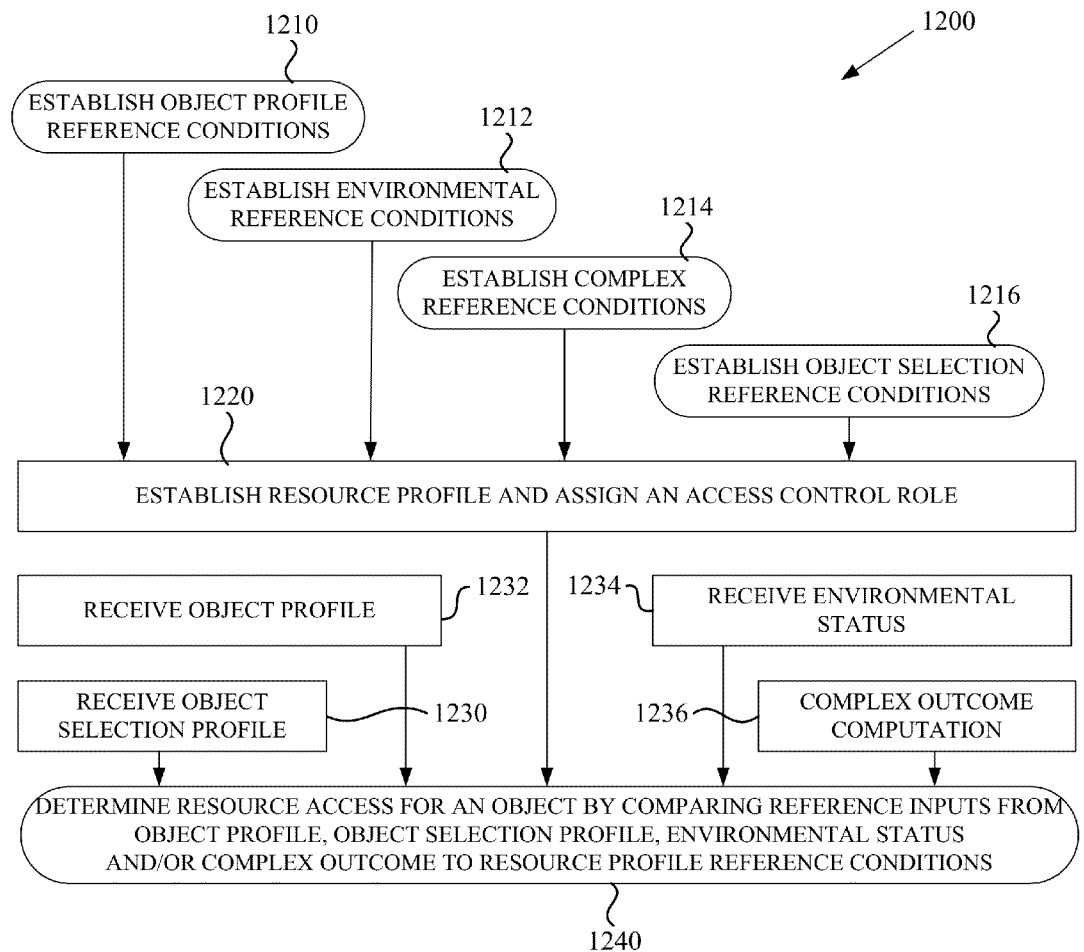
FIG. 13 shows a flowchart of an embodiment of a method in accordance with the Enterprise Dynamic Access Control System and Method Using an Object Selection Profile.

FIG. 13 shows a flowchart of an embodiment of a method 1200 in accordance with the Enterprise Dynamic Access Control System and Method Using an Object Selection Profile. Method 1200 may begin by establishing reference conditions. One or more types of reference conditions may be established depending upon the desired access control configuration. In some embodiments of method 1200, step 1210 involves establishing object profile reference conditions, step 1212 involves establishing environmental reference conditions, step 1214 involves establishing complex reference conditions, and step 1216 involves establishing object selection reference conditions. In some embodiments of method 1200, any combination of steps 1210, 1212, 1214, and 1216 are performed. In some embodiments, steps 1210, 1212, 1214, and 1216 are performed by a resource manager. As an example, the reference conditions may be established as shown in and discussed with respect to FIG. 8 and shown in FIG. 12, and may involve resource manager 80 interfacing with input device 30 as shown in FIG. 1.

Next, method 1200 may proceed to step 1220, which involves establishing a resource profile and assigning an access control role to the resource profile. Step 1220 may be performed by resource manager 80 by inputting information in input device 30 as shown in FIG. 1. Examples of resource profiles are shown in FIGS. 6, 15, and 17. Reference condition values are selected in a certain combination to create resource profile(s) that establish criteria for object access to a resource role of a resource such as resource 70. For example, any combination of environmental reference values, object profile value, complex reference values, and object selection profile values may be chosen as reference conditions and designated to one or more resource profiles.

Next, depending upon the configuration of access control system, method 1200 may proceed to one or more of steps 1230, 1232, 1234, and 1236. Step 1230 involves receiving object selection profile reference inputs. As an example as shown in FIG. 1, the object selection profile reference inputs may be received by processor 40 from storage device 60 or may be received by processor 40 in real-time. The object selection profile reference inputs are contained in an object profile that may be created by an object 20 that is trying to gain access to resource 70. For example, if the resource is a computer system, and the object is a system user, the object selection profile is created by the system user. As an example, the system user may create the object selection profile by making selection into the object selection profile manager service (input device 30) thus producing an object selection profile which is then compared to a resource profile by the rules engine (processor 40) to determine resource access to the computer system. Examples of established object selection profiles are shown in FIGS. 16A-16F.

Continuing with FIG. 13, method 1200 may then proceed to step 1240, which involves determining access to a resource by comparing all furnished reference inputs from the object profile, object selection profile, environmental status, and/or complex outcome calculation with reference conditions from the resource profile. Using the above example, step 1240 may be performed by the computer system. As shown in FIG. 1, step 1240 of FIG. 13 would be performed by processor 40, referencing software services and information stored therein and/or stored within storage devices 50 and/or 60. Examples of comparisons between object selection profiles and resource profiles are shown in FIGS. 17-22.

Some or all of the steps of method 1200 may be stored on a computer-readable storage medium, such as a non-transitory computer-readable storage medium, wherein the steps are represented by computer-readable programming code. The steps of method 1200 may also be computer-implemented using a programmable device, such as a computer-based system. Method 1200 may comprise instructions that may be stored within a processor, such as processor 40 shown in FIG. 1, or may be loaded into a computer-based system, such that the processor or computer-based system then may execute the steps of method 1200. Method 1200 may be implemented using various programming languages, such as "Java", "C" or "C++".

Various storage media, such as magnetic computer disks, optical disks, and electronic memories, as well as non-transitory computer readable storage media and computer program products, can be prepared that can contain information that can direct a device, such as a micro-controller or processor 40, to implement method 1200. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

FIG. 14 illustrates an example of established references in a CMD. A CMD 1300 may contain multiple reference categories 1310. Every value in the reference categories has a reference value 1320 (denoted as rV) preceded with a unique identifier (i.e. rV122). A reference value sub-tree 1330 (rVT) represents a parent rV with associated children rV's. An RM, such as RM 702 as shown in FIG. 8, selects one or more rVs or rVTs to establish a set of reference conditions inside a resource profile. Resource profiles represent criteria by which an object gains access to resource role(s) on a resource.

FIG. 15 illustrates an example diagram 1400 of various resource profiles correlating to access conditions to respective resource roles. As shown in FIG. 15, the enterprise dynamic access control system 1410 contains various resource profiles 1420 and assigned access control roles 1430. Each access control role 1430 is related to a corresponding resource role 1440 within resource 1450. Reference conditions 1460 illustrates ARPs, reference conditions 1470 illustrate DRPs. For purposes of clarity, a resource profile 1420 may include an indicator, such as an unfilled checkmark, illustrating whether the resource profile is an ARP, or may include an indicator, such as a filled checkmark, illustrating whether the resource profile is a DRP.

FIGS. 16A-16F illustrate examples of an object selection profiles. The object creates an object selection profile by selecting only rV(s) via the object profile manager service, which has a view to the CMD. The rVs within an object selection profile are then compared by the RES with the resource profile(s). Examples of such a comparison are shown in FIGS. 17-22.

Figure 16A:
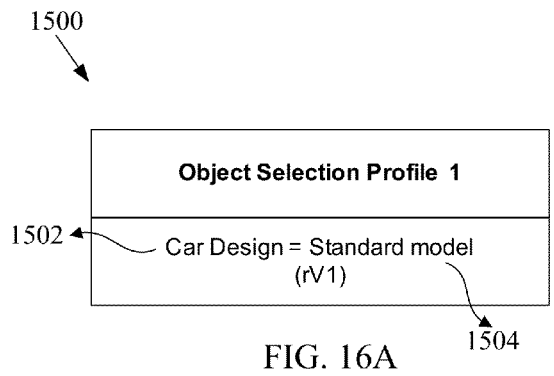
FIGS. 16A-16F illustrate examples of object selection profiles.
Figure 16B:
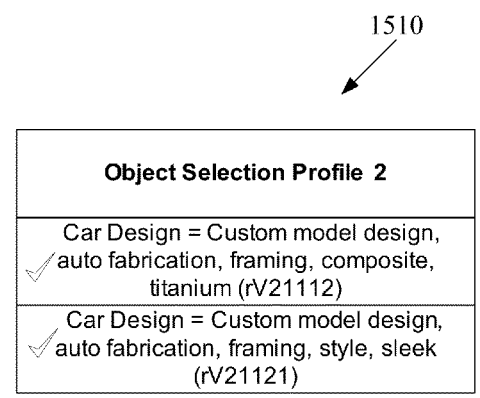
Figure 16C:
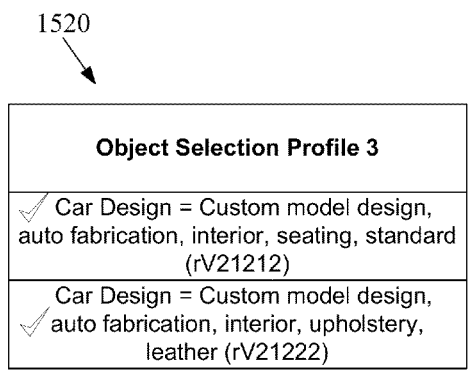
Figure 16D:
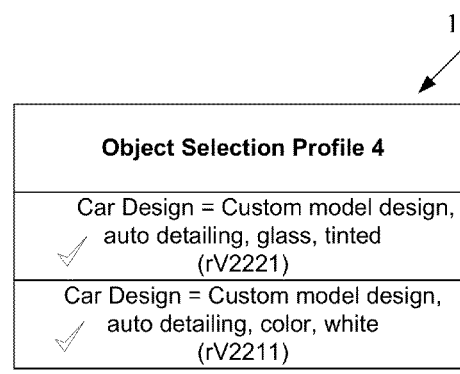
Figure 16E:
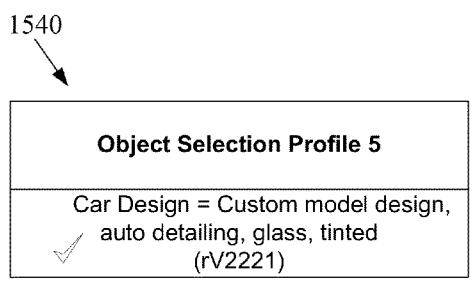
Figure 16F:
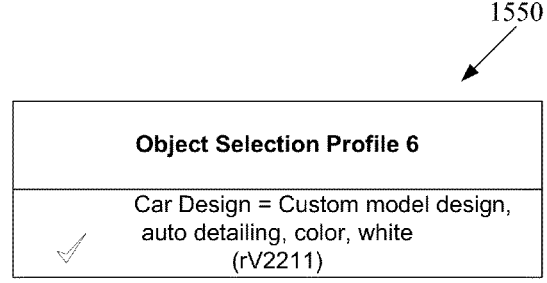

As shown in FIG. 16A, an object selection profile 1500 contains a reference category 1502, such as car design, and a reference value 1504, such as standard model (rV1). Unlike the object profile, the object selection profile may contain multiple rV(s) belonging to an associated reference category. Accordingly, as shown in FIGS. 16B-16D, the object selection profiles 1510, 1520, and 1530 each contain one reference category (car design), but contain two reference values (rV) belonging to that reference category. For example, object selection profile 1530 in FIG. 16D contains reference values (rV2221) and (rV2211) for the car design reference category.

FIGS. 17-22 illustrate how various object selection profiles (shown in FIGS. 16A-16F) are granted or denied resource role access when compared to the resource profiles (shown in FIG. 15).

As shown in diagram 1600 of FIG. 17, the reference condition values (rV1) from the ARP resource profile 1610 equals the reference input value (rV1) from the object selection profile 1620. Therefore, because the resource profile's access control role (Standard Model) 1630 is mapped to the resource role Standard Model 1640, the object is granted access to the Standard Model resource role.

As shown in diagram 1700 of FIG. 18, the reference condition values (rV21112 and rV21121) from the ARP resource profile 1710 equal the reference input values (rV21112 and rV21121) from the object selection profile 1720. Therefore, because the resource profile's access control role (named Structural Design) 1730 is mapped to the resource role Structural Design 1740, the object is granted access to the Structural Design resource role.

Figure 19:
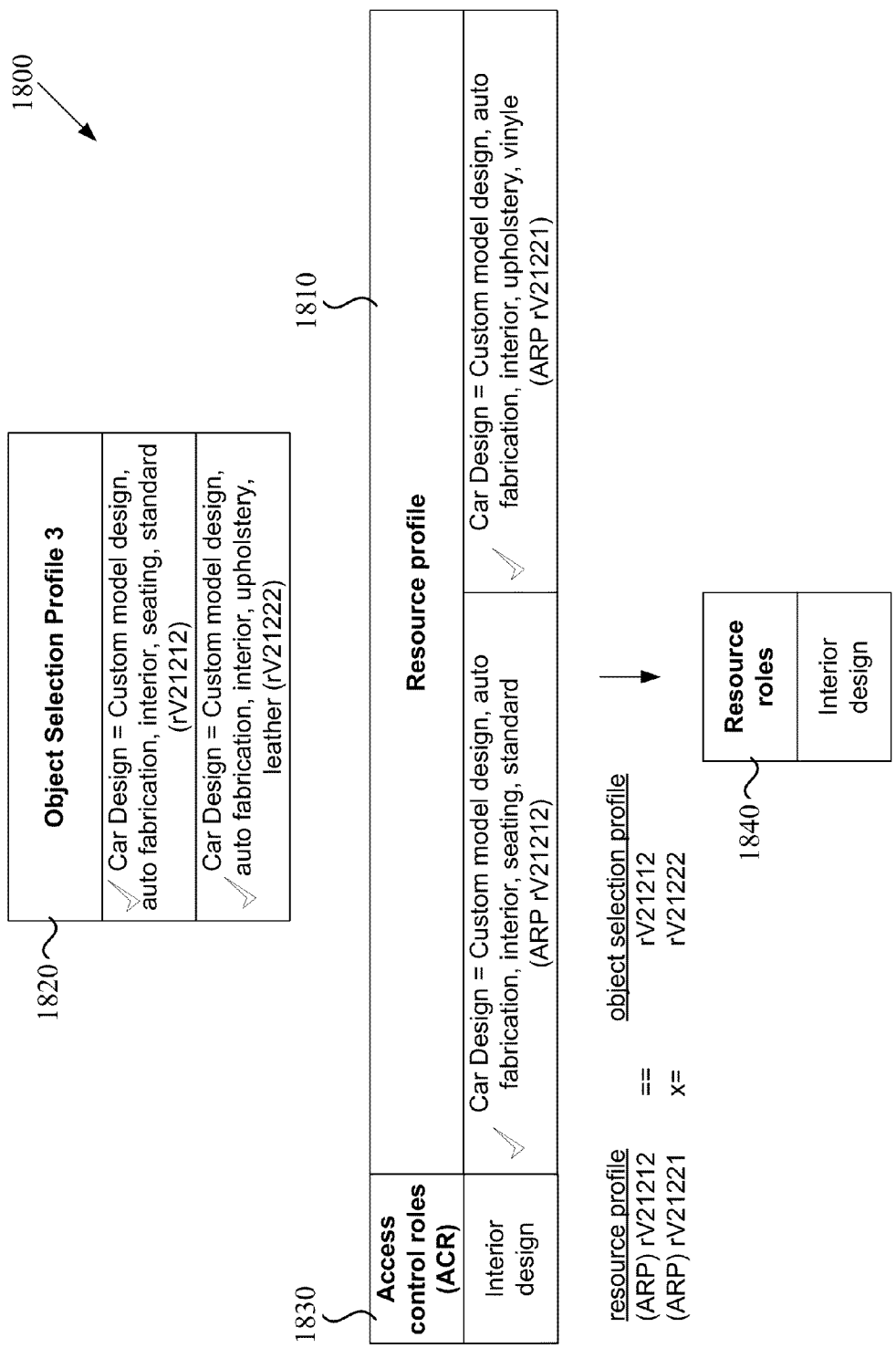

As shown in diagram 1800 of FIG. 19, the reference condition values (rV21212, rV21221) from the ARP resource profile 1810 do not all equal the reference input values (rV21212, rV21222) from the object selection profile 1820. Therefore, because the resource profile's access control role (named Interior Design) 1830 is mapped to the resource role, Interior Design 1840, the object is not granted access to the Interior Design resource role.

Figure 20:
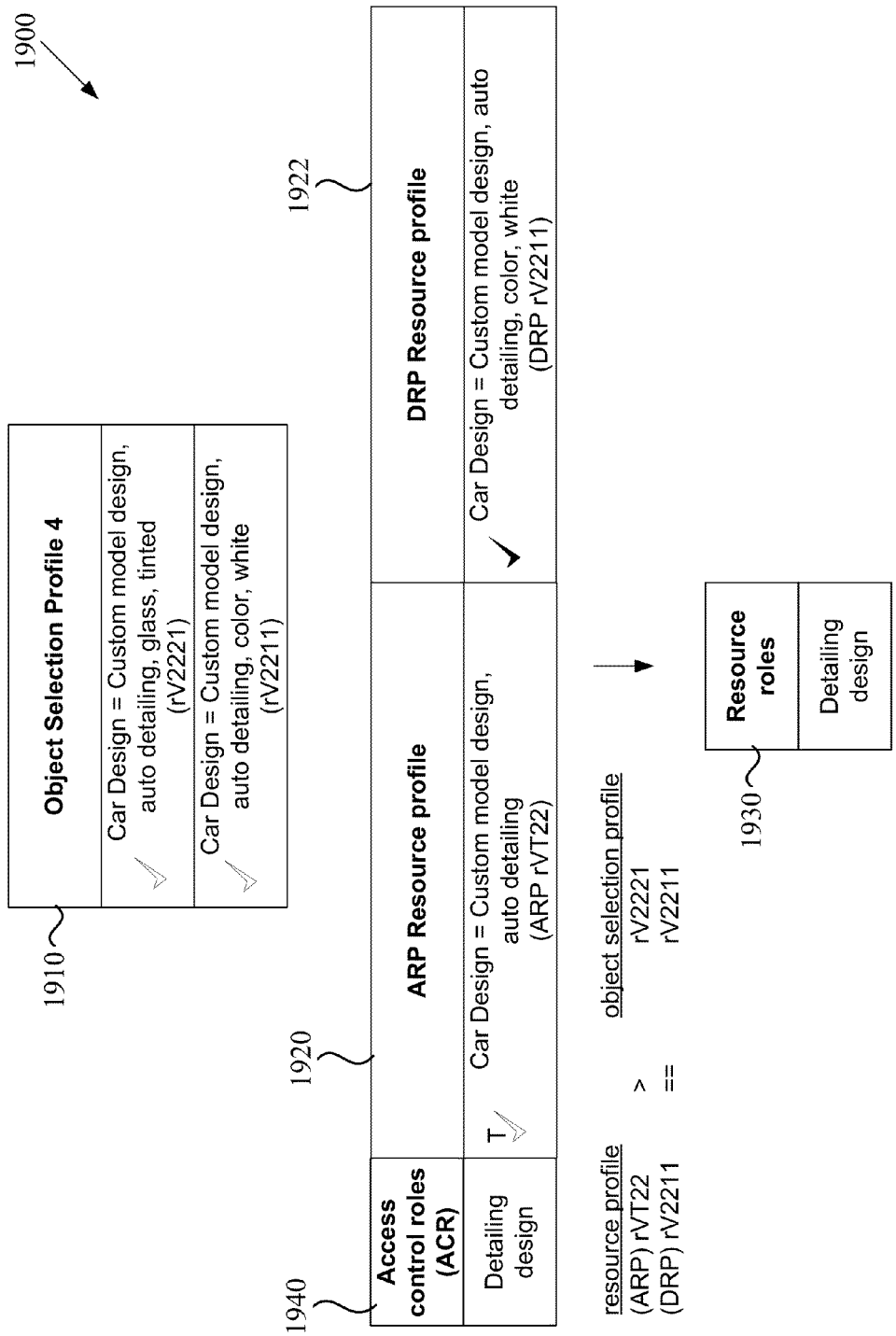

As shown in diagram 1900 of FIG. 20, the reference sub-tree value (rVT22) condition of the ARP resource profile 1920 is a parent of two reference values (rv2211 and rV2221) inputs from the object selection profile 1910, so a match exists between the ARP resource profile 1920 and the object selection profile 1910. However, because the reference value (rV2211) condition from the DRP resource profile 1922 equals to at least one reference values (rv2211) input from the object selection profile 1910, the object selection profile 1910 does match to the DRP resource profile 1922. Therefore, because the ARP and DRP resource profile's access control role (named Detailing Design) 1940 is mapped to the resource role Detailing Design 1930, the object is not granted access to the Detailing Design resource role. Matches between a DRP resource profile and an object selection profile shall always supercede matches between an ARP resource profile and an object selection profile.

Figure 21:
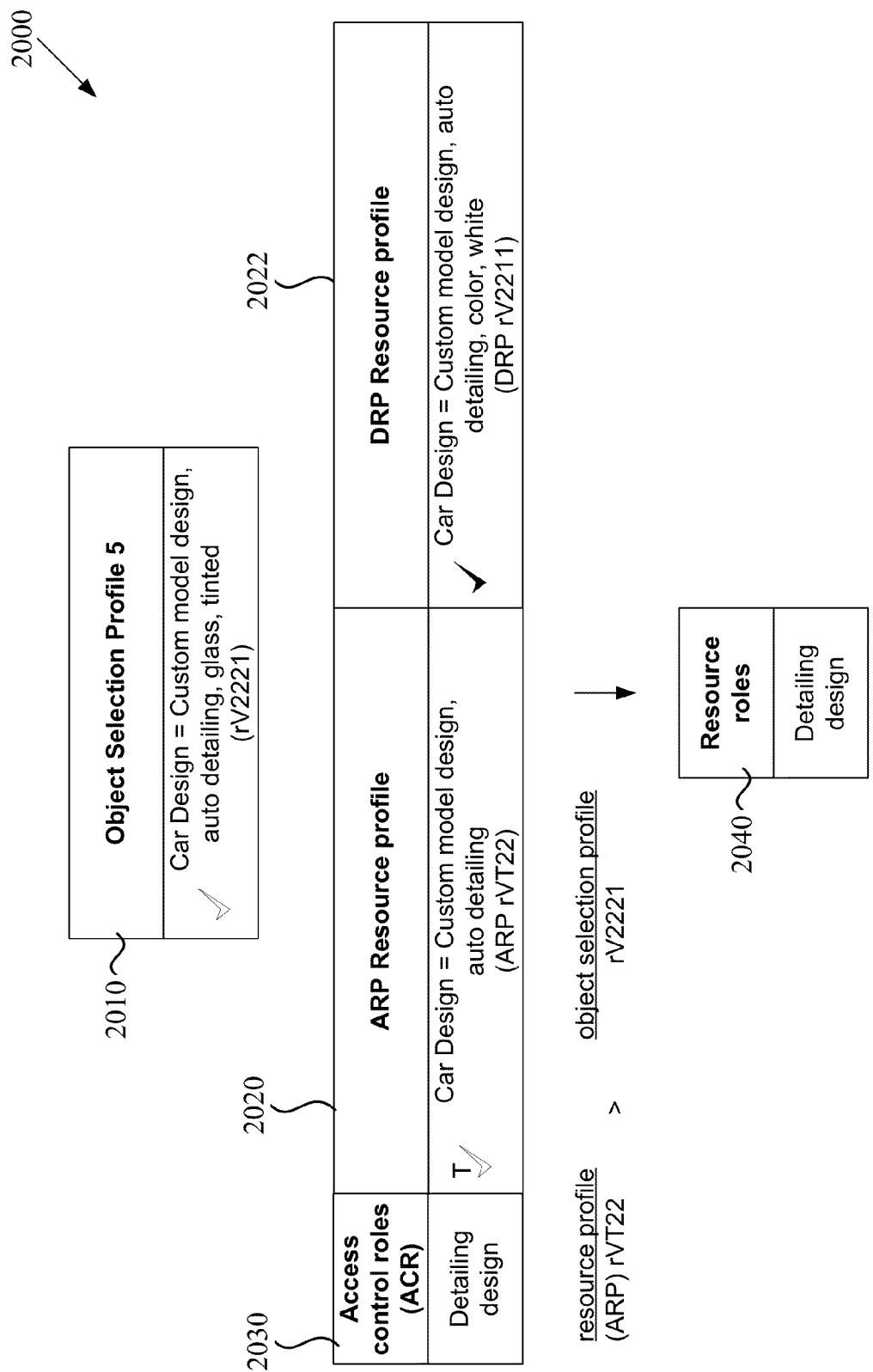

As shown in diagram 2000 of FIG. 21, the reference value sub-tree (rVT22) condition of the ARP resource profile 2020 is a parent of the reference values (rV2221) input from the object selection profile 2010, so a match exists between the ARP resource profile 2020 and the object selection profile 2010. The reference value (rV2211) condition of the DRP resource profile 2022 does not equal to any of the reference value (rV2221) input from the object selection profile 2010. Therefore, because the resource profile's access control role (named Detailing Design), 2030 is mapped to the resource role Detailing Design 2040, the object is granted access to the Detailing Design resource role.

Figure 22:
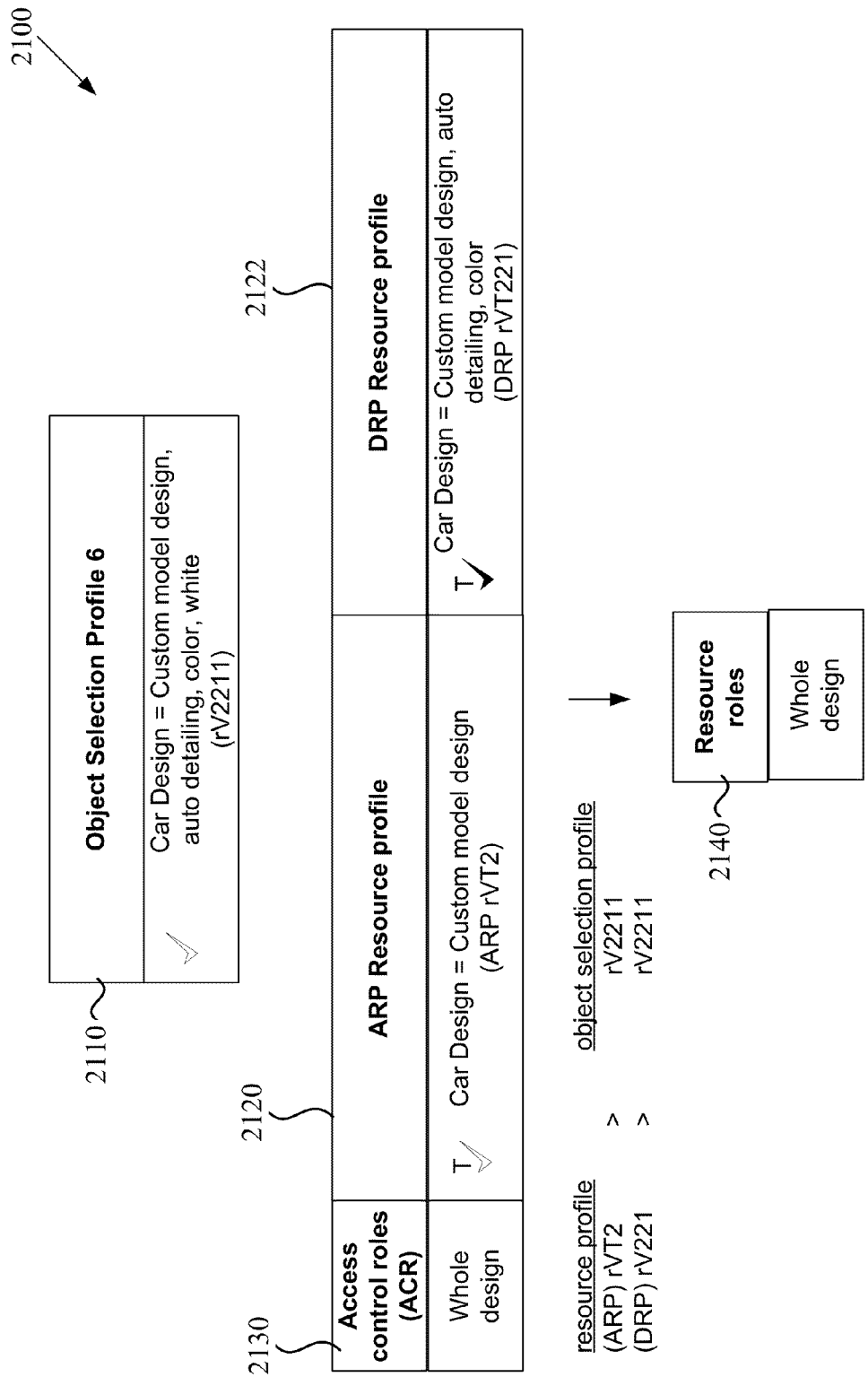

As shown in diagram 2100 of FIG. 22, the reference value (rV2211) input of object selection profile 2110 exists under an ARP resource reference value sub-tree (rVT2) condition of ARP resource profile 2120. However, the same reference value input of object selection profile 2110 also exists under a DRP reference value sub-tree (rVT221) condition of DRP resource profile 2122. Therefore, given the access control role 2130 of whole design, the object (not shown) does not have access to the whole design resource role 2140, as any match with a DRP supersedes any ARP match. Continuing in this example, the reference value sub-tree (rVT2) condition of the ARP resource profile 2120 is a parent of the reference value (rV2211) input of the object selection profile, so a match exists. However, because the reference value sub-tree (rVT221) condition from the DRP resource profile 2122 is a parent of the reference value (rV2211) input of the object selection profile, a match also exists. Therefore, because the ARP and DRP resource profile's access control role (named Whole Design) 2130 are mapped to the resource role Whole Design 2140, the object is not granted access to the Whole Design resource role. Matches between a DRP resource profile and an object selection profile shall always supercede matches between an ARP resource profile and an object selection profile.

Many modifications and variations of the Enterprise Dynamic Access Control System and Method Using an Object Selection Profile are possible in light of the above description. Within the scope of the appended claims, the Enterprise Dynamic Access Control System and Method Using an Object Selection Profile may be practiced otherwise than as specifically described. The scope of the claims is not limited to the implementations and embodiments disclosed herein, but extends to other implementations and embodiments as may be contemplated by those having ordinary skill in the art.

I claim:

1. A system comprising:
   a first data storage device having an object profile stored therein;
   a second data storage device having one or more resource profiles stored therein;
   a data input device configured to allow an object to create an object selection profile; and
   a processor, operatively coupled to the first and second data storage devices and the data input device, having instructions stored therein to determine access of the object to a resource by comparing reference inputs from at least one of the object profile, the object selection profile, an environmental status, and a complex outcome to one or more resource profile reference conditions contained in at least one of the resource profiles, the comparison of object profile reference inputs to one or more of the resource profile reference conditions based on a plurality of object profile reference categories, each object profile reference category including a plurality of hierarchically linked object profile reference values, the object profile representing no more than one object profile reference value for each of the object profile reference categories, the comparison of object selection profile reference inputs to one or more of the resource profile reference conditions based on a plurality of object selection profile reference categories, each object selection profile reference category including a plurality of hierarchically linked object selection profile reference values, the object selection profile comprising one or more object selection profile values for a particular object selection profile category.

2. The system of claim 1, wherein the object selection profile is created by the object in response to a condition established by a resource manager via the data input device.

3. The system of claim 1, wherein the one or more resource profiles each contain one or more reference value and reference value sub-tree conditions pertaining to at least one of the object profile, the environmental status, the object selection profile and the complex outcome, wherein the resource profile reference conditions include one or more of the corresponding reference value and value sub-tree conditions.

4. The system of claim 1, wherein the reference value inputs of the objection profile, the object selection profile, the environmental status, and the complex outcome are each compared to one or more resource profile reference values and reference value sub-tree conditions grouped in a particular set within one or more resource profiles by a rules engine service module stored as instructions within the processor.

5. The system of claim 1, wherein the processor contains instructions stored therein to grant resource access to the object if the reference inputs from at least one of the object profile, the object selection profile, the environmental status, and the complex outcome match all allow resource profile reference conditions and do not match any deny resource profile reference conditions.

6. The system of claim 1, wherein the processor contains instructions stored therein to deny access of the object to the resource if the reference inputs of any of the object profile, the object selection profile, the environmental status, and the complex outcome calculation do not match any of the corresponding allow resource profile reference conditions or match any of the corresponding deny resource profile reference conditions.

7. The system of claim 1, wherein the complex outcome is a result of a calculation that is a function of any of the reference inputs of the environmental status, the object profile and the object selection profile, wherein the comparison of complex outcome reference inputs to the one or more resource profile reference conditions is based on a complex reference category including a plurality of hierarchically linked complex reference values.

8. The system of claim 1, wherein the environmental status represents a reference input stored within one of the first and second data storage devices, wherein the comparison of the reference input values of the environmental status to the resource profile reference conditions is based on an environmental reference category including a plurality of hierarchically linked environmental reference values, wherein the resource profile further represents the minimum environmental reference values necessary to access the resource.

9. The system of claim 8, wherein the environmental reference values comprise data representing a condition selected from the group consisting of time-of-day, date, process status, security threat level, and weather condition.

10. The system of claim 1, wherein the object profile reference values comprise data representing object characteristics selected from the group consisting of security clearance, pay grade, job function, job title, employer, and organizational group.

11. The system of claim 1, wherein the one or more resource profiles each contain the minimum number of object profile values, object selection profile values, complex reference values, and environmental reference value conditions necessary for access of the object to the resource.

12. A system architecture comprising:
a rules engine service configured to determine access of an object to a resource by comparing reference inputs from at least one of an object profile, an object selection profile, an environmental status, and a complex outcome to one or more reference conditions contained in one or more resource profiles, the comparison of the object profile reference inputs to the one or more resource profile reference conditions based on a plurality of object profile categories, each object profile category including a plurality of hierarchically linked object profile values, the object profile representing no more than one object profile value for each of the object profile categories, the comparison of the object selection profile reference inputs to the one or more resource profile conditions based on a plurality of object selection profile categories, each object selection profile category including a plurality of hierarchically linked object selection profile values, the object selection profile comprising one or more object selection profile values for a particular object selection profile category.

13. The system architecture of claim 12 further comprising a repository service, interfaced with the rules engine service, configured to store object profile, object selection profile, environmental status, and complex outcome reference conditions and inputs.

14. The system architecture of claim 13 further comprising an administrator service, interfaced with the repository service, configured to perform configuration management on the repository service.

15. The system architecture of claim 13 further comprising a condition manager service, interfaced with the repository service and a customer meta-database, configured to establish the conditions in the repository service.

16. The system architecture of claim 15 further comprising a condition status service, interfaced with the repository service and the customer meta-database, configured to detect changes between the conditions stored in the repository service and data stored in the customer meta-database.

17. The system architecture of claim 12 further comprising a structured format service, interfaced with an object profile manager service, an object selection profile manager service, an environmental interface, a repository service, and a customer meta-database, configured to convert the object profile, object selection profile, environmental status, and complex outcome into a structured format.

18. The system architecture of claim 12, wherein the comparison of the reference inputs of the environmental status to the resource profile is based on an environmental reference category including a plurality of hierarchically linked environmental reference values, wherein the resource profile further represents the minimum environmental reference values necessary to access the resource.

19. A non-transitory computer-readable storage medium having instructions encoded thereon, the instructions represented by computer-readable programming code, the instructions comprising the step of:

determining access of an object to a resource by comparing reference inputs from at least one of an object profile, an object selection profile, an environmental status, and a complex outcome calculation to one or more reference conditions contained in one or more resource profiles, the comparison of the object profile reference inputs to the one or more resource profile reference conditions based on a plurality of object profile categories, each object profile category including a plurality of hierarchically linked object profile values, the object profile representing no more than one object profile value for each of the object profile categories, the comparison of the object selection profile reference inputs to the one or more resource profile reference conditions based on a plurality of object selection profile categories, each object selection profile category including a plurality of hierarchically linked object selection profile values, the object selection profile comprising one or more object selection profile values for a particular object selection profile category.

20. The non-transitory computer-readable storage medium of claim 19, wherein the comparison of the reference inputs of the environmental status to the resource profile reference conditions is based on an environmental reference category including a plurality of hierarchically linked environmental reference values, wherein the one or more resource profiles further represent the minimum environmental reference values necessary to access the resource, and the environmental status represents no more than one environmental reference value for each of the environmental reference categories.

* * * * *